United States Patent
Hori et al.

(10) Patent No.: US 6,845,406 B2
(45) Date of Patent: Jan. 18, 2005

(54) INFORMATION PROCESSING EQUIPMENT, SIGNAL TRANSFORMATION EQUIPMENT, METHOD OF COMMUNICATIONS, AND COMPUTER PRODUCT

(75) Inventors: Masato Hori, Kawasaki (JP); Akira Oshima, Kawasaki (JP); Kentaro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 547 days.

(21) Appl. No.: 09/845,331

(22) Filed: May 1, 2001

(65) Prior Publication Data
US 2004/0225780 A1 Nov. 11, 2004

(30) Foreign Application Priority Data

Dec. 27, 2000 (JP) .................... 2000-399492

(51) Int. Cl.[7] .......... G06F 3/00; G06F 13/00; G06F 15/16; H03H 7/30
(52) U.S. Cl. .......... 710/10; 710/316; 709/227; 375/232
(58) Field of Search .................. 710/100, 305, 710/106, 316, 10; 709/227, 228; 379/93.32; 375/135, 136, 222; 713/310

(56) References Cited

U.S. PATENT DOCUMENTS

| 4,419,751 | A | * | 12/1983 | Cholat-Namy et al. ..... 370/241 |
| 5,600,712 | A | * | 2/1997 | Hanson et al. ......... 379/142.06 |
| 5,675,813 | A | * | 10/1997 | Holmdahl .................... 713/310 |
| 5,675,831 | A | * | 10/1997 | Caputo ........................ 710/10 |
| 6,088,430 | A | * | 7/2000 | McHale .................... 379/93.28 |
| 6,161,201 | A | * | 12/2000 | Payne et al. .................. 714/43 |
| 6,360,281 | B1 | * | 3/2002 | Feagans ........................ 710/1 |
| 6,374,288 | B1 | * | 4/2002 | Bhagavath et al. ......... 709/203 |
| 6,690,718 | B1 | * | 2/2004 | Kim ........................... 375/222 |

FOREIGN PATENT DOCUMENTS

| JP | HEI 3-154557 A | 7/1991 |
| JP | HEI 6-30074 A | 2/1994 |
| JP | HEI 8-321891 A | 12/1996 |
| JP | HEI 10-327259 A | 12/1998 |

* cited by examiner

Primary Examiner—Tim Vo
(74) Attorney, Agent, or Firm—Staas & Halsey LLP

(57) ABSTRACT

Prior to the initialization, CPU of information processing equipment makes a decision about whether a communication line has been connected to a connector or not. When the two are connected, the CPU does not carry out the initialization and shifts xDSL modem to lower power consumption mode. The connection is checked as follows. A test signal is transmitted through the xDSL modem. This signal is reflected by the connector and reflection is received by hybrid circuit. When the energy of this echo is large it means that the communication line it not connected to the connector, when the energy is small it means that the two are connected.

12 Claims, 19 Drawing Sheets

FIG.15

|  | | STATUS OF POWER SOURCE | |
| --- | --- | --- | --- |
|  | | EXTERNAL POWER MODE | INTERNAL POWER SOURCE MODE |
| ERROR CONTENTS | ERROR IN SOFTWARE PROCESSING | L TIMES | M TIMES |
|  | NO RESPONSE FROM THE OTHER PARTY | L TIMES | N TIMES |

WHERE N<M<L

FIG.18

|  | | STATUS OF POWER SOURCE | |
|---|---|---|---|
|  | | EXTERNAL POWER MODE | INTERNAL POWER SOURCE MODE |
| ERROR CONTENTS | ERROR IN SOFTWARE PROCESSING | t1 | t2 |
| | NO RESPONSE FROM THE OTHERPARTY | t2 | t2 |

WHERE t1<t2

INFORMATION PROCESSING EQUIPMENT, SIGNAL TRANSFORMATION EQUIPMENT, METHOD OF COMMUNICATIONS, AND COMPUTER PRODUCT

FIELD OF THE INVENTION

The present invention relates to a technology which allows to enjoy both, high convenience based on always on access to a communication line and suppression of wasteful power consumption.

BACKGROUND OF THE INVENTION

In recent years, an xDSL modem as represented by the ADSL modem has become popular. The xDSL modem has been used in various ways depending on the services of ISP (Internet Service Providers). In many cases, the xDSL modem has been used for providing always on access type services. Therefore, the xDSL modem operates to place the priority to the connection of a communication line during all times. For example, the xDSL modem has been designed to operate with priority to try connecting a personal computer to a communication line at the time when the power supply to the personal computer is turned on or immediately after the line has been disconnected.

At present, a reduction in power consumption of various machines has been strongly required from the viewpoint of global warming prevention. This situation is not an exception in computers and communication equipment. From this viewpoint, the xDSL technology has had a problem of a rise in power consumption as this technique has been considered based on always on access. Notwithstanding this requirement, a focus has mainly been placed on the increase in transmission speed to a higher speed and on a noise reduction, with no sufficient care paid to the power saving. From the above situation, at present, there has been strongly demanded for a technique of reducing power consumption without losing the own characteristics of the xDSL like the high-speed transmission and always on access.

Specifically, a portable information processing equipment like a notebook-type computer is connected to a communication line only sometimes, as it is carried based on the needs. When the notebook-type computer establishes a communication path in this unconnected status, this leads to a waste of power consumption, and this is not suitable from the viewpoint of global warming prevention.

Further, in the case of an installation-type information processing equipment like a desktop personal computer, a communication line is not always connected to this personal computer even when the owner has contracted to always on access. For example, when a user has both a desktop personal computer and a notebook-type computer, the user changes a connection of the communication line from the desktop computer to the notebook-type computer in many cases. In this case, the desktop personal computer is used as a standalone-type computer for using application like a word-processor software and a spread sheet software. The establishment of a communication path in this status also leads to a waste of power consumption, and this is not suitable either.

SUMMARY OF THE INVENTION

It is an object of the present invention to provide a technology which allows to enjoy both, high convenience based on a always on access to a communication line and suppression of wasteful power consumption. It is another object of this invention to provide a computer readable recording medium that stores a computer program which when executed realizes the method according to the present invention.

As a result of carrying out a detailed study on the contents of power consumption of the xDSL modem, the inventor of the present invention has found that a considerable amount of power is consumed for establishing a communication path. In other words, a considerable amount of power is consumed for a negotiation operation and an initializing operation for starting a connection to secure again a communication path, out of the total power consumption of the xDSL modem. As a result, the inventor has tried to reduce the total power consumption by suppressing mainly the power consumption in the operation of establishing a communication path. The aspects of the present invention will be explained as follows.

In the information processing equipment according to one aspect of this invention, a communication line is connected to a connector when required. Then, a transmission/reception mechanism transmits/receives data through the communication line connected to the connector.

In this case, it is not possible to carry out actual communication when only the communication line is simply connected to the connector. It is also necessary to carry out an initialization processing such as a checking of the quality of the line, and a determination of a transmission speed, and then to establish a communication path. Therefore, a control unit controls a transmission/reception mechanism, thereby to suitably carry out the initial processing prior to the actual data communication.

However, in a status that the communication line has not been connected to the connector (an unconnected status), there is no possibility that a communication path is established at all. The execution of the initialization in the unconnected status is a waste of power. In order to avoid this, connection status deciding unit makes a decision about whether the communication line has been connected to the connector or not. The control unit does not carry out the initialization when the connection status deciding unit has decided that the communication line has not been connected to the connector. According to the first aspect of the present invention, it is possible to avoid the wasting of power as it is not possible to carry out the initialization when there is no possibility of the establishment of a communication path.

In the information processing equipment according to another aspect of this, a control unit controls a transmission/reception mechanism to carry out the initialization, thereby to establish a communication path. When the initialization is carried out only once, there may be a failure in establishing the communication path because of an influence of temporary noise. Therefore, the control unit copes with this situation by repeating the initialization by a prescribed number as an upper limit determined separately.

In this case, depending on a cause of a failure in the initialization such as, for example, no response from the other partner, or a software error, there is a case where the possibility of establishing a communication path is considered to be small when the initialization is repeated further. Further, depending on the status of a power source, it is desired to suppress power consumption as far as possible. For example, when the power is supplied from batteries, the use of a large volume of power for the initialization shortens the operation time of the information processing equipment itself. On the other hand, when the power is supplied from an AC power source, it is considered that the priority should be placed on establishing a communication path over the suppression of power, in many cases. Therefore, the control unit determines the prescribed number according to the cause of a past failure in the initialization and/or the status of the power source at that time.

According to the above-mentioned aspect, it is possible to suppress power consumption and it is also possible to obtain the convenience of maintaining the status of having a communication path established. It is possible to achieve both of them in high dimension. In many cases, this effect can be obtained based on always on access. This is particularly effective in the xDSL technique and in the information processing equipment that uses batteries as a power source.

In the information processing equipment according to still another aspect of this, a control unit controls a transmission/reception mechanism to carry out the initialization, thereby to establish a communication path. In this case, there may be a failure in establishing the communication path because of a temporary reason. Therefore, the control unit tries to establish a communication path again after a lapse of a waiting period separately determined.

In this case, depending on a cause of a failure in the initialization such as, for example, no response from the other partner, a software error, etc., there is a case where it is considered that the possibility of establishing a communication path soon thereafter is low. On the other hand, there is a case where it is considered that the possibility of establishing a communication path soon thereafter is high. Further, depending on the status of a power source, there is a case where it is desired to suppress power consumption as far as possible. For example, when the power is supplied from batteries, the use of a large volume of power for the initialization shortens the operation time of the information processing equipment itself. On the other hand, when the power is supplied from an AC power source, it is considered that the priority should be placed on establishing a communication path over the suppression of power, in many cases. Therefore, the control unit determines the waiting period according to the cause of a past failure in the initialization and/or the status of the power source at the time.

According to the above-mentioned aspect, it is possible to suppress power consumption and it is also possible to obtain the convenience of maintaining the status of having a communication path established. It is possible to achieve both of them in high dimension. In many cases, this effect can be obtained based on always on access. This is particularly effective in the xDSL technique and in the information processing equipment that uses batteries as a power source.

In the signal conversion equipment according to still another aspect of this, a connector is connected with a communication line based on the needs. A transmission/reception mechanism transmits/receives data through the communication line connected to the connector. A detecting switch mechanically detects whether the communication line has been connected to the connector or not. A deciding circuit makes a decision on a connection status based on a result of the detection by the detecting switch. Then, the deciding circuit outputs a predetermined signal that shows the decision result to a communication control unit. The communication control unit can know whether the communication line has been connected or not, based on this signal. According to this aspect, data based on a machine type is not necessary for making a decision on the connection status. Therefore, the general applicability of software is not lost.

In the signal conversion equipment according to still another aspect of this, a connector is connected with a communication line based on the needs. A transmission/reception mechanism transmits/receives data through the communication line connected to the connector. A detecting switch mechanically detects whether the communication line has been connected to the connector or not. A deciding circuit makes a decision on a connection status based on a result of the detection by the detecting switch. Then, the deciding circuit stores a result of the decision into a memory. Therefore, a communication control unit can confirm a connection status of the communication line by making access to this memory. According to this aspect, data based on a machine type is not necessary for making a decision on the connection status. Therefore, the general applicability of software is not lost.

The computer readable recording medium according to still another aspect of the present invention stores a computer program which when executed realizes the method according to the present invention.

Other objects and features of this invention will become apparent from the following description with reference to the accompanying drawings.

BRIEF DESCRIPTION OF THE DRAWINGS

FIG. 15 is a diagram showing contents of a definition of a prescribed number in a fourth embodiment of the present invention;

FIG. 18 is a diagram showing contents of a definition of a waiting period in a fifth embodiment of the present invention;

DESCRIPTION OF THE PREFERRED EMBODIMENTS

Preferred embodiment of the present invention will be explained in detail with reference to the accompanying drawings. However, these embodiments do not limit the present invention.

Figure 1:
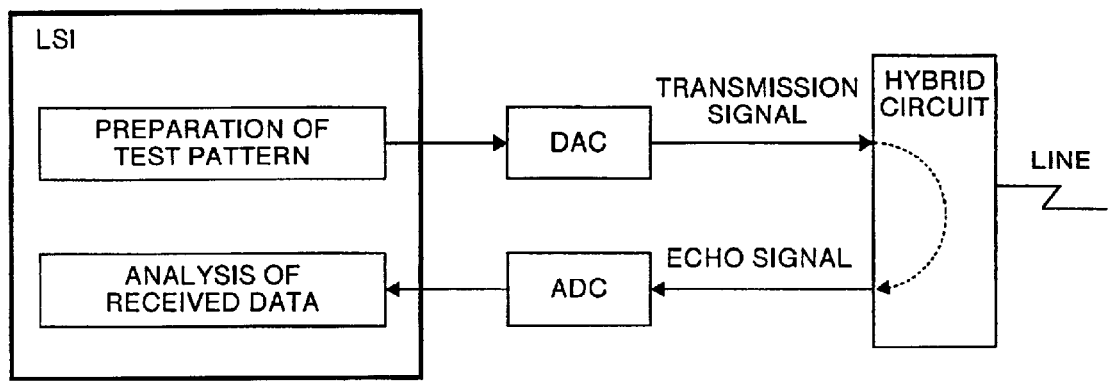
FIG. 1 is a diagram showing a concept of a first embodiment of the present invention.

The information processing equipment relating to a first embodiment of the present invention is an information processing equipment equipped with an xDSL modem. In the first embodiment, a decision is made about whether a communication line 150 has been physically connected to this information processing equipment or not. When the communication line 150 has not been physically connected to this information processing equipment as a result of a decision made, an operation for establishing a communication path, such as, initialization, for example, is not carried out. Thus, power consumption is reduced. Particularly, according to the first embodiment, a tone signal of a predetermined test pattern is transmitted, and this echo is measured and evaluated, thereby to make a decision about whether the communication line 150 has been physically connected to the information processing equipment or not, as shown in FIG. 1. This will be explained in detail below.

Figure 2:
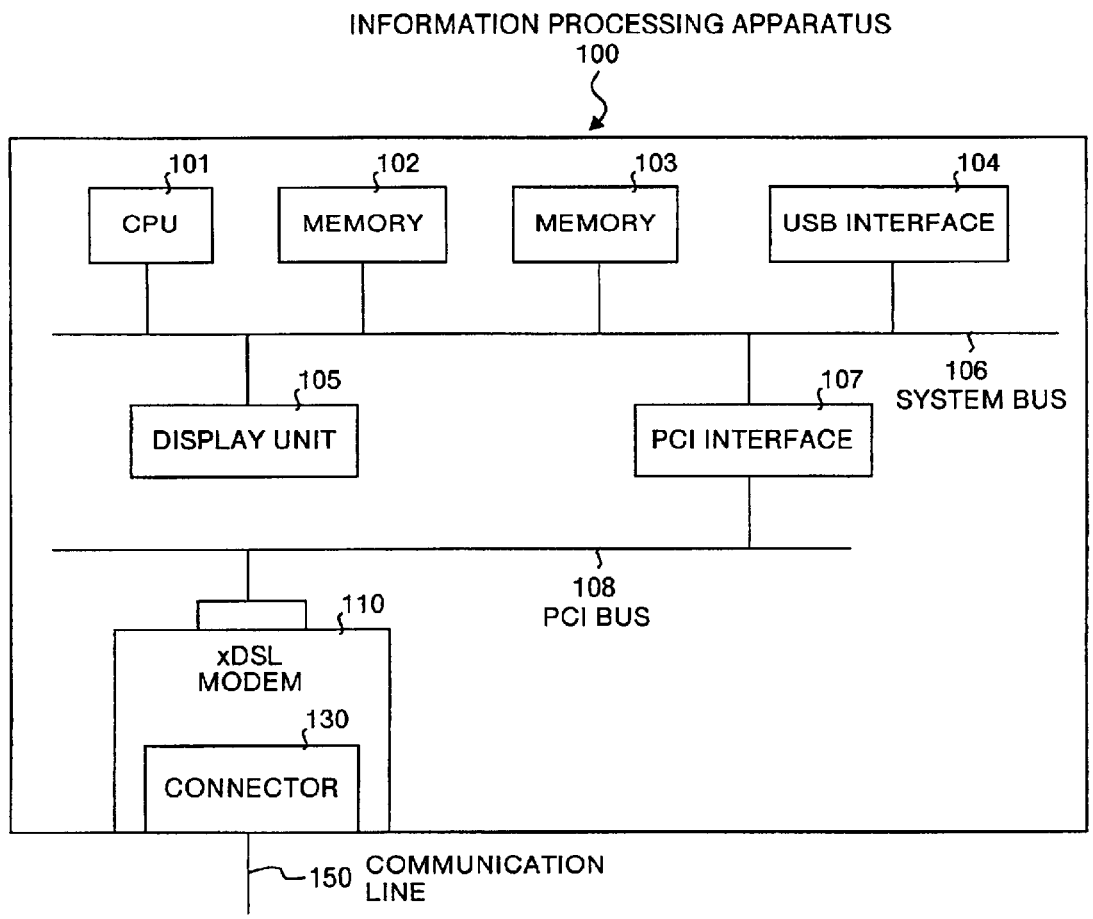
FIG. 2 is a block diagram showing an internal structure of an information processing equipment in the first embodiment of the present invention.

As shown in FIG. 2, information processing equipment 100 of the first embodiment includes CPU 101, memories 102 and 103, USB interface 104, and display unit 105. These are connected to each other through a system bus 106. Input devices such as a mouse and a keyboard not shown are connected to the USB interface 104. The information processing equipment 100 further includes PCI interface 107, and PCI bus 108 that is managed by this. The PCI bus 108 is equipped with slots capable of mounting various expansion circuits based on the needs. In this embodiment, an xDSL modem 110 is mounted on the slot, which also constitutes a part of the information processing equipment 100 together with the above units.

The CPU 101 is for carrying out various kinds of data processing as well as controlling the whole information processing equipment 100. The CPU 101 loads a program held in the memory 103 onto the memory 102, and executes the loaded program, thereby to achieve various functions, such as, for example, a communication function through the xDSL modem 110.

This communication function is the function of carrying out a data communication with the other party like a base station that is connected to the information processing equipment through a communication line 150. This is carried out based on the control of the xDSL modem 110 by the CPU 101 through the PCI interface 107 and the PCI bus 108. During the communications, the CPU 101 itself executes various kinds of processing such as initialization by controlling the xDSL modem 110 and the like. Further, the CPU 101 carries out a processing of making a decision (a connection decision processing in FIG. 6 to be described later) about whether the communication line 150 has been physically connected to a connector 130 or not.

In the present embodiment, this decision is made based on a size of energy of an echo obtained when a tone signal of a predetermined test pattern has been transmitted. A reference value is necessary for the size of the energy of the echo in order to carry out this connection decision processing. This reference value is described in advance in a program, what is called device driver or software of the xDSL modem 110, for achieving this communication function. The echo itself will be described in the explanation of a hybrid circuit 126 that is held by the xDSL modem 110.

Various programs for achieving various functions are executed under an OS (Operating System) that the CPU 101 executes. In the present embodiment, the OS itself makes a decision about whether a communication path has been established or not. When a communication path has not been established, the OS generates a call.

The programs for achieving various kinds of functions need not be structured as individually independent programs. It is needless to mention that these programs can be collected into one program. Any kind of classification mode on the program structure is acceptable. So long as the above-described functions are achieved as a whole, this structure is sufficient.

The memory 103 is for storing various kinds of programs to be executed by the CPU 101, and data to be transmitted/received. Programs to be stored in the memory 103 include, for example, a program (device driver or software) and the OS for achieving the communication function by controlling the xDSL modem 110 and the like. This memory 103 is structured by any one of or a combination of a hard disk unit, an optical magnetic disk unit, a nonvolatile memory like a flash memory, a readable recording medium like a CD-ROM, and a volatile memory like a RAM (Random Access Memory).

A structure of the xDSL modem 110 shown in FIG. 2 will be explained next with reference to FIG. 3. This xDSL modem 110 has two kinds of operation modes, a normal mode and an power saving mode, with different levels of power consumption. The normal mode is an operation mode of operating the whole xDSL modem 110 for executing a data communication or the like. The power saving mode is a mode in which the operation of a LSI 111 and an AFE 121 of the xDSL modem to be described later is halted.

In this power saving mode, the power consumption is lower than that in the normal mode as the LSI 111 and the AFE 121 of the xDSL modem have been halted in the power saving mode. However, in this power saving mode, at least a PCI interface 112 to be described later is in the operation status for detecting an interruption signal and the like. The setting of this operation mode is changed based on the setting of the contents of filter setting registers 115a and 115b to a predetermined value respectively.

Figure 3:
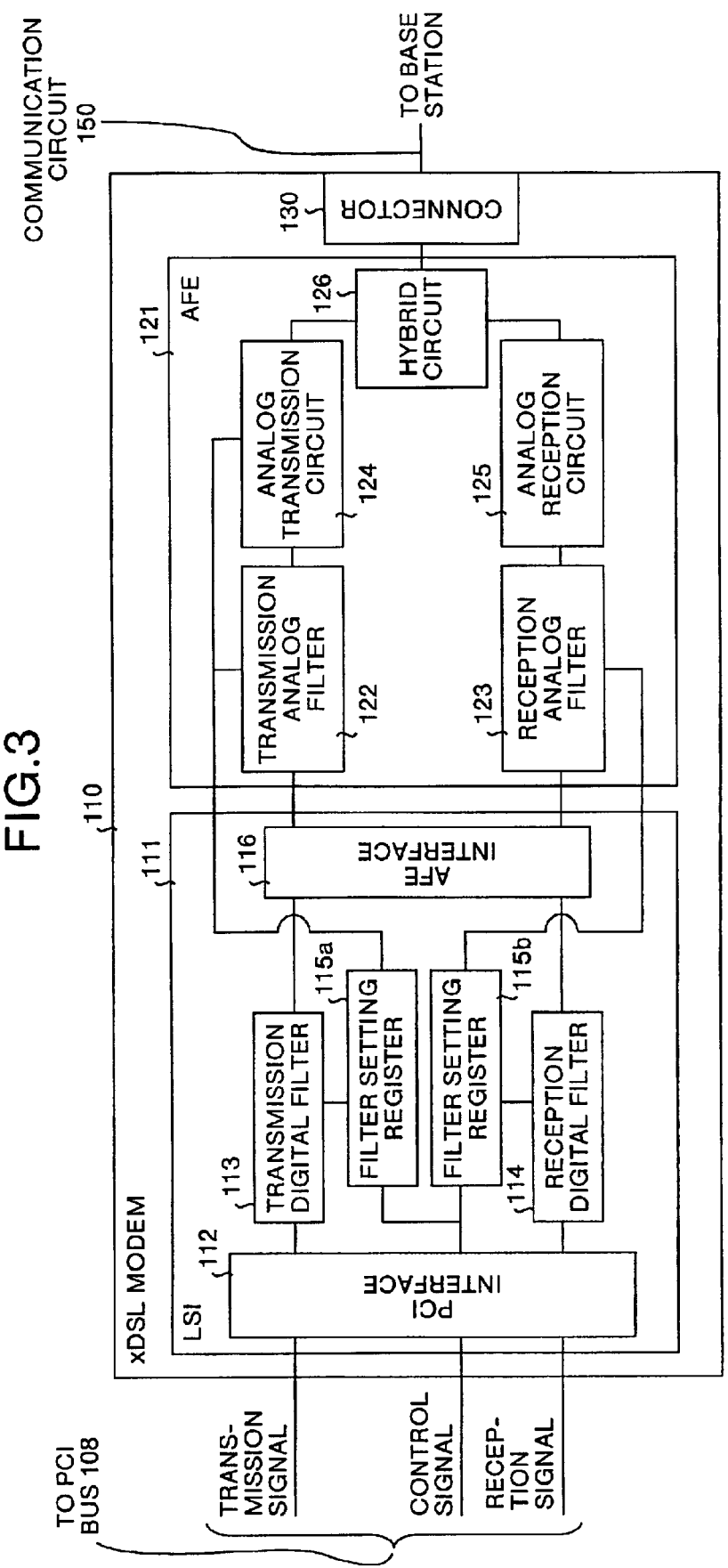
FIG. 3 is a block diagram showing an internal structure of an xDSL modem.

The xDSL modem 110 consists of the LSI 111, the AFE 121, and the connector 130, as shown in FIG. 3. The LSI 111 is for managing the whole xDSL modem 110 and for processing the data transmitted/received through the communication line 150, based on a control signal input through the PCI bus 108.

Specifically, this LSI 111 consists of the PCI interface 112, a transmission digital filter 113, a reception digital filter 114, the filter setting registers 115a and 115b, and a AFE interface 116.

The PCI interface 112 is for managing a connection with the PCI bus 108, and transmission/reception of various data. Various kinds of control signals and transmission/reception data to/from this LSI 111 are input/output to/from this LSI 111 all through the PCI interface 112. As described above, this PCI interface 112 is in the operating status in both the normal mode and the power saving mode.

The transmission digital filter 113 is for processing transmission data (a digital signal). Specifically, this transmission digital filter 113 consists of IIR filters and others. The operation status (operation/halt) of this transmission digital filter 113 is set according to the contents written in the filter setting register 115a. In other words, the transmission digital filter 113 is in the halted status in the power saving mode.

The reception digital filter 114 is for processing a signal (received data) transmitted through the communication line 150. Specifically, this reception digital filter 114 consists of an IIR (Infinite-duration Impulse Response) filter, an FIR (Finite-duration Impulse Response) filter, and others. The operation status (operation/halt) of this reception digital filter 114 is set according to the contents written in the filter setting register 115b. In other words, the reception digital filter 114 is in the halted status in the power saving mode.

The filter setting registers 115a and 115b are for holding information for setting the operation status of each part of the xDSL modem 110. Specifically, the filter setting register 115a holds information for setting operation statuses of the transmission filters (the transmission digital filter 113, and a transmission analog filter 122), and a power supply status to an analog transmission circuit 124.

In the mean time, the filter setting register 115b holds information for setting operation statuses of the reception filters (the reception digital filter 114, and a reception analog filter 123). The contents of these filter setting registers 115a and 115b can be rewritten based on control signals input from the CPU 101 through the PCI interface 107 and the PCI bus 108.

In the present embodiment, the contents within the filter setting registers 115a and 115b are rewritten based on the needs, thereby to halt the transmission digital filter 113 and suppress power consumption. As described above, the operation mode (the normal mode, or the power saving mode) of the xDSL modem 110 can be set by setting the contents of these filter setting registers 115a and 115b to a predetermined value respectively.

The AFE interface 116 is for intermediating between the LSI 111 as a digital circuit and the AFE 121 consisting of analog circuits. The AFE (Analog Front End) 121 consists of a transmission analog filter 122, a reception analog filter 123, an analog transmission circuit 124, an analog reception circuit 125, and a hybrid circuit 126. The AFE 121 also includes an A/D converter and a D/A converter not shown in the drawing. Based on these converters, digital data can be transmitted/received to/from the LSI 111.

The transmission analog filter 122 is for processing transmission data. This transmission analog filter 122 changes its operation status (operation/halt) according to the contents written in the filter setting register 115a. Specifically, this transmission analog filter 122 is in the halted status in the power saving mode.

The reception analog filter 123 is for processing data (reception data) transmitted through the communication line 150. This reception analog filter 123 changes its operation status (operation/halt) according to the contents written in the filter setting register 115b.

The analog transmission circuit 124 is for controlling a transmission power spectrum of a signal (a transmission signal) to be transmitted to the communication line 150. This analog transmission circuit 124 includes capacitors and others. Further, this analog transmission circuit 124 includes a switch for turning ON/OFF the power supply to this analog transmission circuit 124. This switch changes its status (ON/OFF) according to the contents of the filter setting register 115a. When this switch is turned OFF, it becomes possible to halt the analog transmission circuit 124, thereby suppressing power consumption.

The analog reception circuit 125 is for adjusting the gain of a signal (a reception signal) transmitted through the communication line 150. This analog reception circuit 125 is always in the operation status while power is being supplied to the xDSL modem 110.

The hybrid circuit 126 is a circuit for converting between two signal lines and four signal lines. In general, a frequency band of a signal used for communication in the upstream direction and a frequency band of a signal used for communication in the downstream direction are differentiated, thereby to realize a bidirectional communication using the communication line 150 consisting of one set (two) of metal wires. Therefore, a set of signal lines (two lines) directed from the analog transmission circuit 124 to the connector 130 and a set of signal lines (two lines) directed from the analog reception circuit 125 to the connector 130 are combined together in this hybrid circuit 126. Thus, these two sets of lines are combined into one set of signal lines (two lines), and these are then connected to the connector 130.

Figure 4:
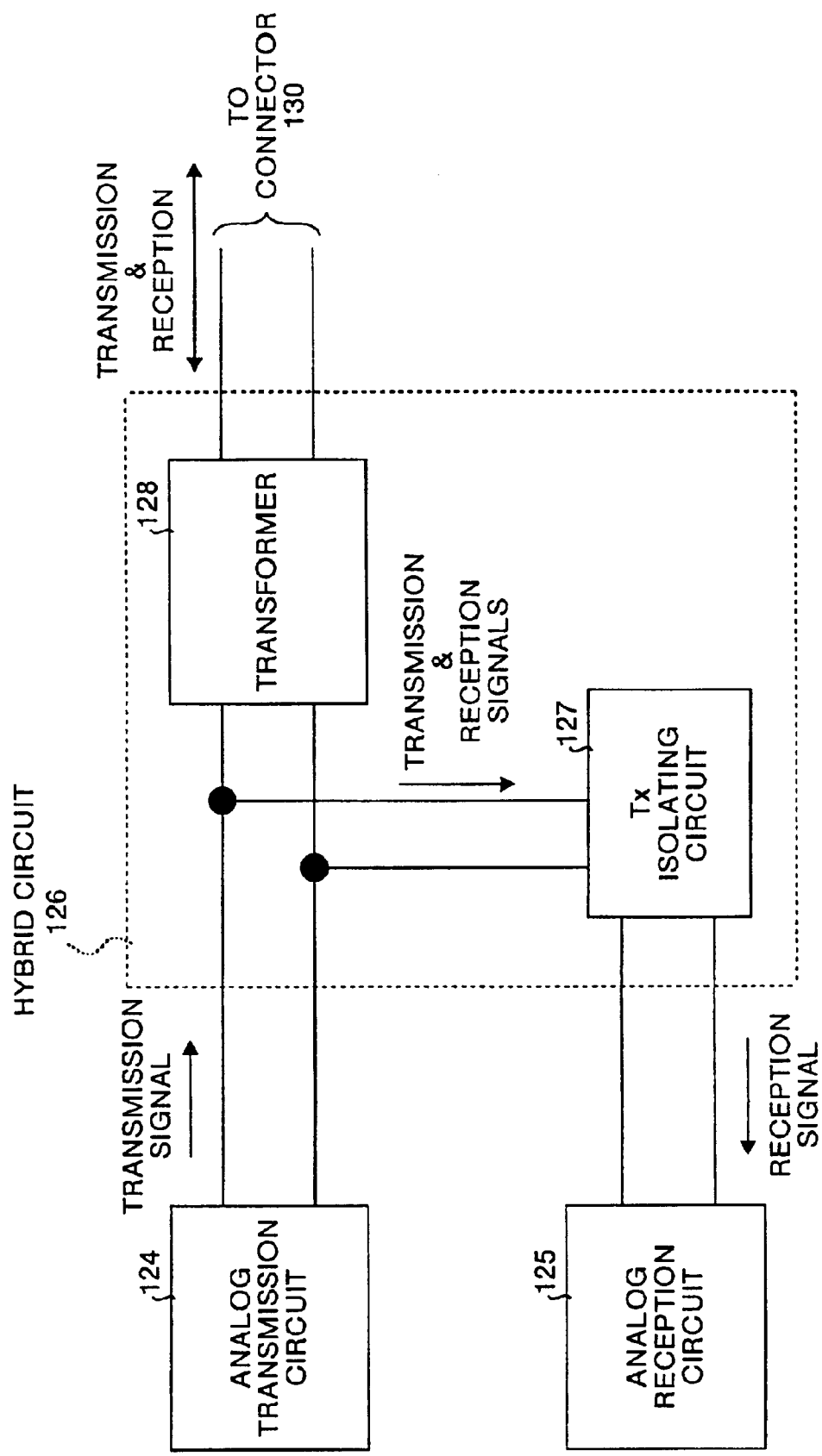
FIG. 4 is a diagram showing an internal structure of a hybrid circuit.

As shown in FIG. 4, the hybrid circuit 126 consists of a Tx isolating circuit 127 and a transformer 128. The Tx isolating circuit 127 is for breaking a transmission signal, and for inputting only a signal (a reception signal) transmitted through the communication line 150 to the analog reception circuit 125. However, the breaking of a transmission signal by the Tx isolating circuit 127 is not complete. Some level (a level not affecting the actual communication) of the transmission signal passes through the Tx isolating circuit 127, and is input to the analog reception circuit 125.

Therefore, a signal (an echo) attributable to this transmission signal is observed at the receiver side. The size of the energy of this echo is different depending on whether the communication line 150 has been physically connected to the connector 130 or not. In general, when the communication line 150 has not been physically connected to the connector 130, this echo is observed about 5 db larger than the echo observed in the connected status. Therefore, as described above, according to the present embodiment, a decision is made about whether the communication line 150 has been physically connected to the connector 130 or not, based on the size of the energy of the echo. The connector 130 is a portion to which the communication line 150 is connected. A modular jack or a modular connector is used for this connector 130.

The power for operating this xDSL modem 110 is supplied through the PCI bus 108. This information processing equipment 100 is operated based on the power stored in an internal power source, that is, batteries incorporated in the information processing equipment 100, or the power supplied from an external power source connected to a power source terminal not shown of the information processing equipment 100. The power supplied to the xDSL modem 110 is also based on the internal power source or the external power source.

Next, the operation will be explained. First, the outline of the communication operation will be explained with reference to FIG. 5. Mainly the CPU 101 performs the following processing by executing a program, what is called device driver or software, for controlling the xDSL modem 110 to carry out communications.

The CPU 101 makes a connection decision about whether the wire of the communication line 150 has been physically connected to the connector 130 or not (step S101). When the wire of the communication line 150 has been physically connected to the connector 130 as a result of this decision, the process proceeds to step S102. When the wire has not been connected, the process does not proceed to step S102. The processing at step S101 will be explained in detail later with reference to FIG. 6.

At step S102, the CPU 101 first carries out a communication path establishment processing for securing a communication path (step S102). The communication path establishment processing includes, for example, initialization for determining a transmission route. This initialization processing is divided into a processing operation at the receiver side and a processing operation at the transmitter side.

For example, in the initialization executed at the time of starting communications, the processing at the receiver side includes a confirmation of a line condition (S/N), and a determination of a transmission rate based on a result of this confirmation. At the receiver side, the transmission rate determined in this way is actually set. In other words, a bit map that prescribes the transmission rate is prepared.

In the mean time, the processing at the transmitter side includes a transmission of predetermined data for measuring the S/N rate at the receiver side. According to the present embodiment, the CPU 101 executes the initialization processing at both sides. This initialization processing and the contents of a data communication carried out at step S103 described later are prescribed in various standards, such as, for example, G. 992.2. These are all known techniques, and therefore, a further explanation on these will be omitted.

After finishing the initialization, the actual data communication is executed based on the needs (step S103). In this case, for carrying out a data communication, a transmission rate determined based on the bit map prepared in the initialization is used. The practical data communication is executed according to the requests from various kinds of applications, such as, for example, a browser. When there is no such particular request, practical communications are not executed, and the xDSL modem 110 keeps a status that a communication path has been established.

Next, the connection decision processing will be explained in detail with reference to FIG. 6. The connection decision processing shown in FIG. 6 is the one carried out at step S101 shown in FIG. 5. The CPU 101 is in the waiting status while repeating making a decision of whether a call has been generated or not (step S201). In this status, the power consumption of the xDSL modem 110 is small as the xDSL modem 110 is not carrying out the operation like the initialization, although the xDSL modem 110 is in the operation status in the normal mode. The CPU 101 generates this call. More specifically, the CPU 101 achieves this function through the execution of the OS. In the case of the OS which supports the always on access, it is general that the OS itself has this function.

When a call has been confirmed as a result of the decision made at step S201, the CPU 101 confirms whether the communication line 150 has been physically connected to the connector 130 or not, at steps S202 to S204, as follows.

The CPU 101 generates a predetermined test pattern, and transmits this to the xDSL modem 110 through the PCI bus 108 and the like. The xDSL modem 110 that has received this test pattern generates a tone signal corresponding to this test pattern, and operates to transmit this tone signal through the communication line 150 (step S202). The transmission of this tone signal requires power consumption like the initialization. However, the time required for this transmission is a few 10 ms. This time is extremely shorter than that required for the initialization. Therefore, the power consumption for this transmission is very small.

In this case, the signal line at the transmitter side and the signal line at the receiver side of the xDSL modem 110 are connected in the hybrid circuit 126. While the transmission signal (the tone signal) has been cut off by the Tx isolating circuit 127 within the hybrid circuit 126, this interruption is not complete. Therefore, the echo of the tone signal is observed at the receiver side of the xDSL modem 110.

The CPU 101 measures the echo of this tone signal, and obtains the size of the energy (step S203). The CPU 101 then compares the measured size of the energy of the echo with a reference value, and makes a decision about the presence/absence of a connection (step S204).

Figure 5:
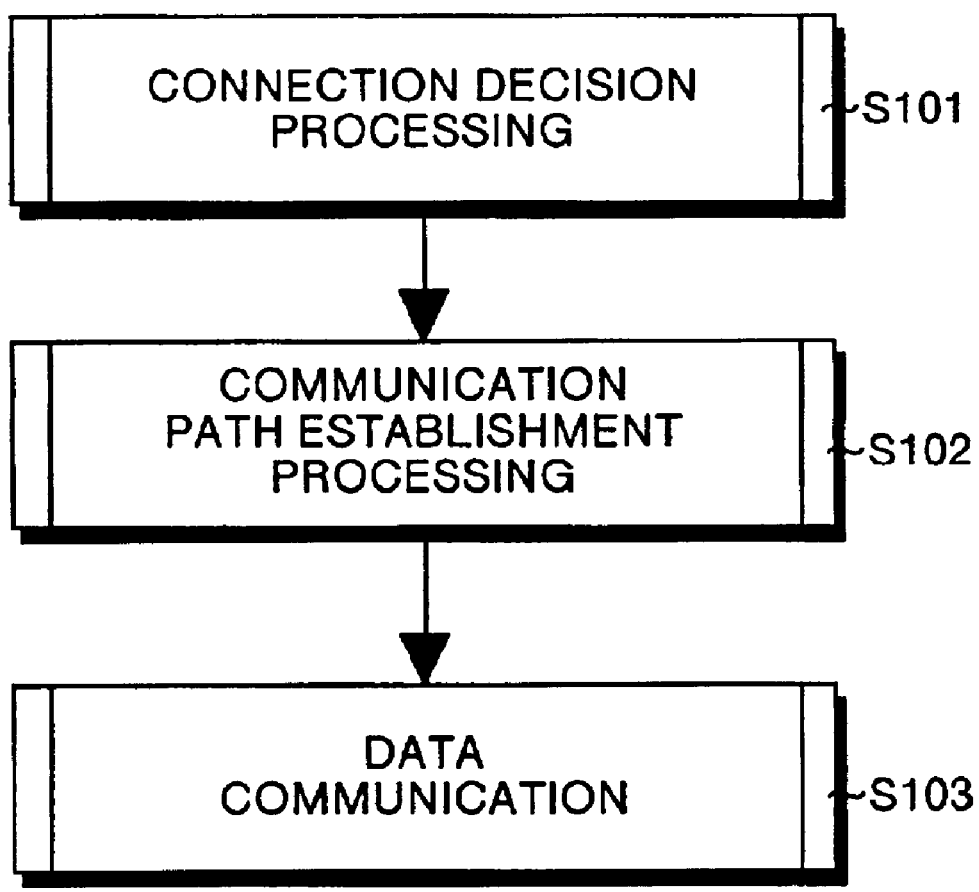
FIG. 5 is a flowchart showing an outline of a communication operation.
Figure 6:
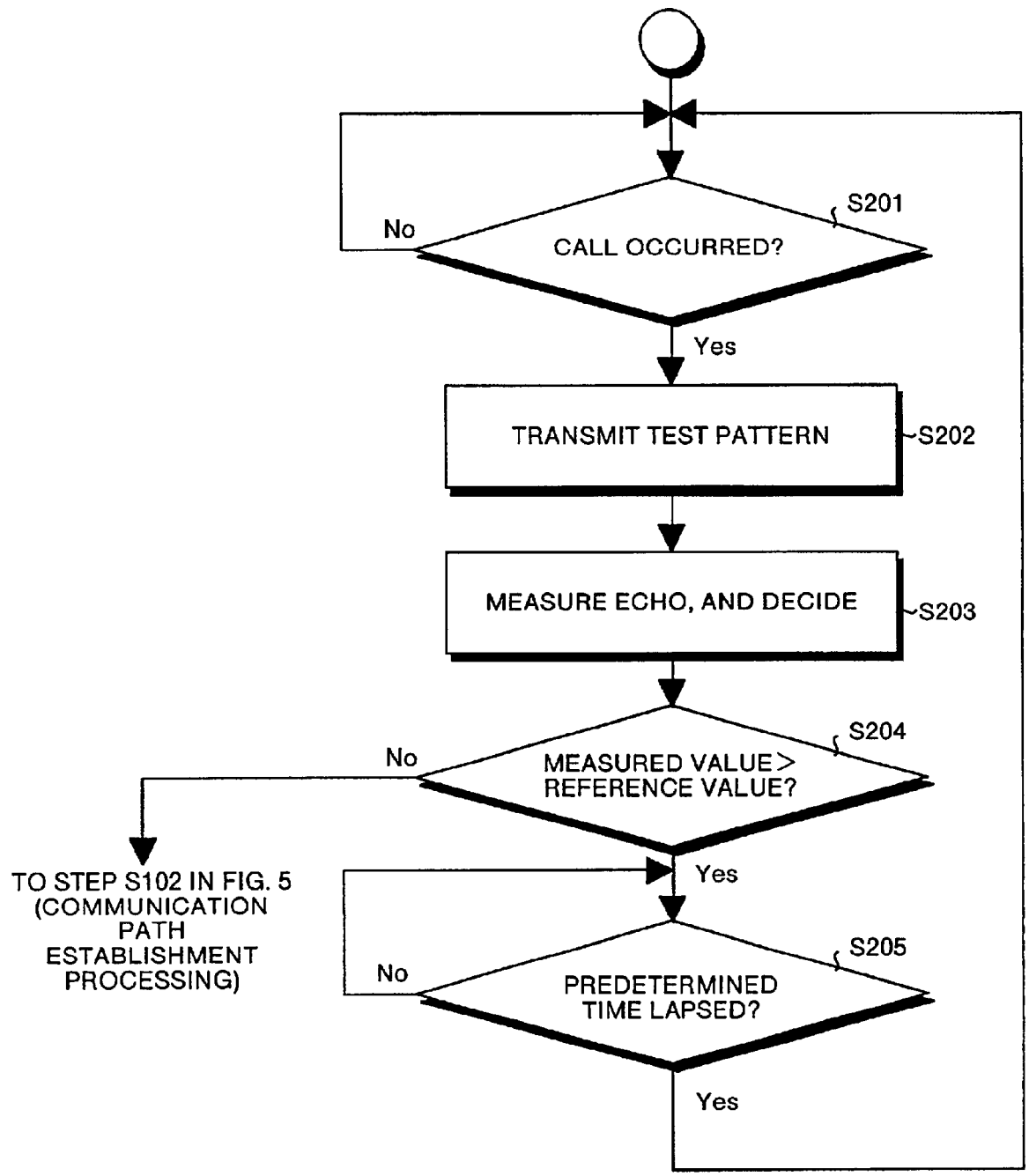
FIG. 6 is a flowchart showing a connection decision processing.

When a decision has been made that a connection has been established, that is, when the measured energy of the echo is equal to or lower than the reference value, as a result of the decision made at step S204, the process proceeds to the processing of step S102 in FIG. 5 to start the establishment of a communication path like the initialization processing.

On the other hand, when a decision has been made that a connection has not been established, that is, when the measured energy of the echo is larger than the reference value, it is regarded that the connection has been a failure. Thus, the process does not proceed to the communication path establishment processing. In this case, the CPU 101 waits for a lapse of a predetermined time (a waiting period) in the waiting status (step S205). After the lapse of this predetermined period of time, the process returns to step S201. Then, a similar processing is repeated.

As explained above, according to the present embodiment, the initialization is carried out only when the communication line 150 has been physically connected to the connector 130, that is, when there is a possibility of the establishment of communications. Therefore, it is possible to suppress wasteful power consumption without losing the advantage of the always on access. Particularly, in the case of the portable information processing equipment like a notebook-type computer, it is possible to effectively reduce power consumption as it is considered that this equipment is in the line unconnected status during an overwhelmingly long period of time. Further, in many cases, the notebook-type computer is operated based on batteries as its power source. Therefore, the reduction in power consumption leads to the elongation of the operation time, which is particularly effective.

When the communication line 150 is in the connected status, the power consumed during the transmission of a test pattern and the connection decision making becomes wasteful. However, this time is as short as a few 10 ms, and therefore, the wasteful power consumption is very small. The principle of a reduction $\Delta W$ in the power consumption according to the present embodiment is defined by the following equation (1).

$$\Delta W = (t_0 \cdot N - t_1) \cdot W_0 \qquad (1)$$

In the equation (1), $t_0$ represents a time required for the initialization. N represents a number (a prescribed number) for repeating the initialization until a decision of a failure is made. The time $t_1$ represents a time required for the transmission of a test pattern and the connection decision making (where $t_0 \gg t_1$). $W_0$ represents power consumption per unit time.

In the waiting status at step S205, it is possible to further lower the power consumption when the xDSL modem 110 is shifted to the power-saving mode.

In the present embodiment, the reference value for deciding the size of the energy of the echo is described in the device driver or software of the xDSL modem 110. This reference value is determined based on a circuit structure inside the xDSL modem, and is a value own to each type of the xDSL modem. Therefore, a ROM may be provided in the xDSL modem, and the ROM stores this reference value. Based on this arrangement, it is possible to avoid losing the general applicability of the device driver or software of the xDSL modem.

The information processing equipment relating to a second embodiment of the present invention is an information processing equipment equipped with an xDSL modem. In the second embodiment, a physical connection status (strictly, a connection/disconnection operation) of a communication line 150 to a connector 130 is detected. Based on a result of this detection, the execution or non-execution of the initialization and the operation status of each part of the xDSL modem are changed, thereby to reduce power consumption.

Figure 7:
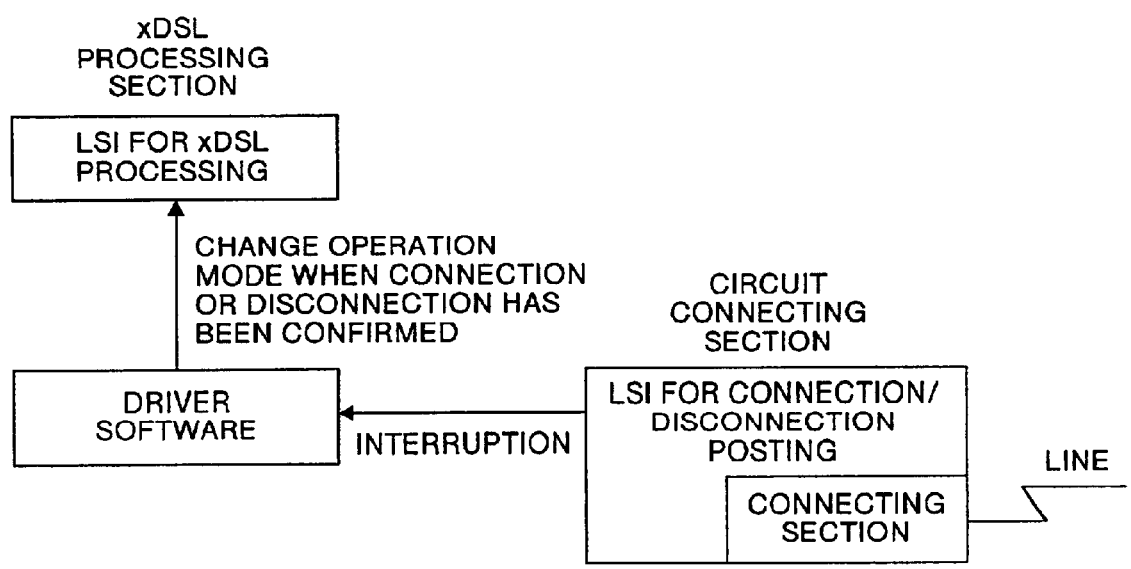
FIG. 7 is a diagram showing a concept of a second embodiment of the present invention.

The second embodiment is different from the first embodiment in that a method of detecting and deciding this connection status is different from that of the first embodiment. As shown in FIG. 7, according to the second embodiment, the connection status (strictly, a connection/disconnection operation) is detected by monitoring a change in the status (ON/OFF) of an exclusive switch 131 provided on connector 130a. This will be explained in detail below. Differences of this embodiment from the first embodiment will be mainly explained below. Portions having similar functions and structures to those of the first embodiment are attached with like reference numbers, and their explanation will be omitted.

Figure 8:
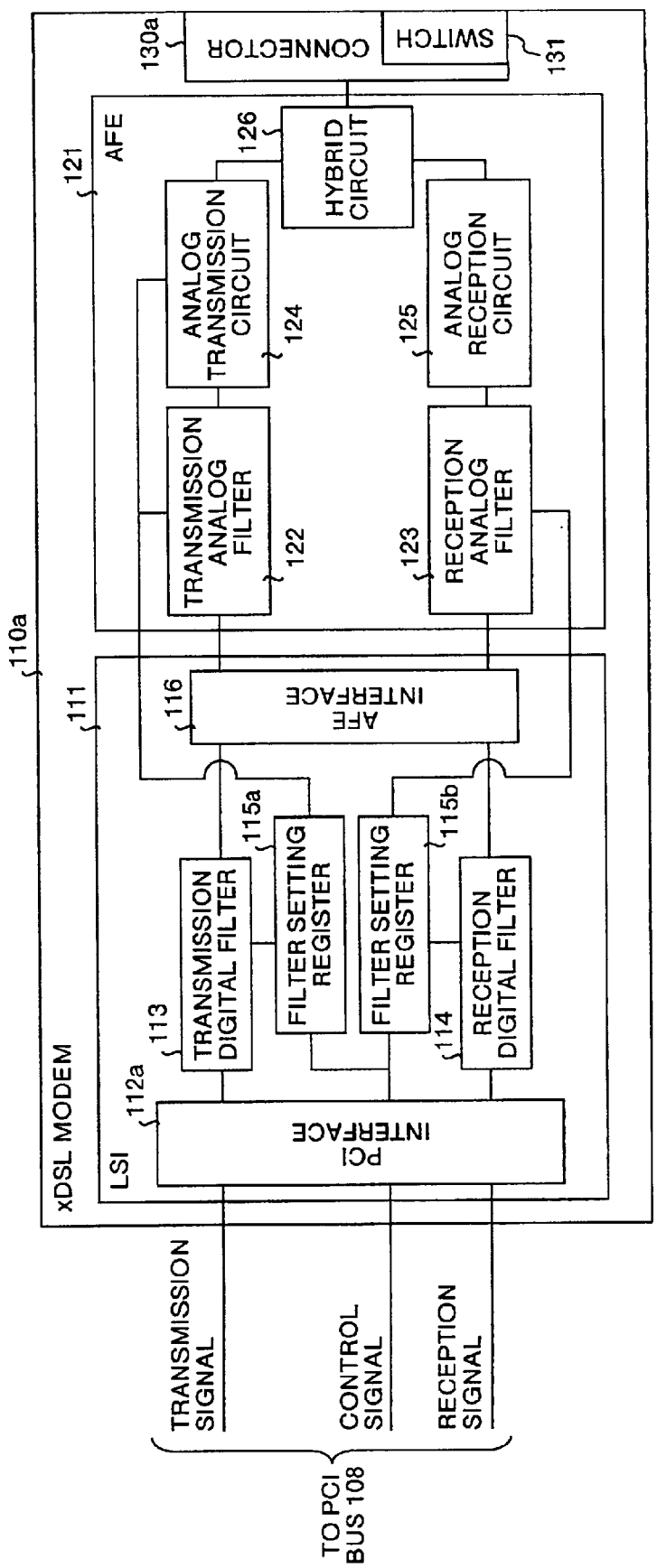
FIG. 8 is a diagram showing an internal structure of an xDSL modem in the second embodiment of the present invention.

FIG. 8 shows an internal structure of an xDSL modem 110a in the present embodiment. The connector 130a includes the switch 131 for detecting a status of a physical connection of communication line 150 with connector 130a about whether the communication line 150 has been inserted into the connector 130 or not.

This switch 131 is turned ON (connected) /OFF (unconnected) according to the connection status. This switch 131 is connected to a PCI interface 112a. This switch 131 is in the ON status when the connector of the communication line 150 has been inserted into the connector 130a. In this status, an electric loop is formed between the connector 130a and the PCI interface 112a.

The PCI interface 112a is structured to transmit a predetermined interruption signal to a CPU 101 of an information processing equipment 100 through a PCI bus 108 and the like, when the status (ON/OFF) of the switch 131 has changed. When the switch 131 has been turned ON, that is when a connection has been established, the PCI interface 112a outputs an interruption signal (hereinafter to be called a "connection post") that shows that the connection has been established.

On the other hand, when the switch 131 has been turned OFF, that is, when the connection has been disconnected, the PCI interface 112a outputs an interruption signal (hereinafter to be called a "disconnection post") that shows that the connection has been disconnected. These interruption signals are used for a CPU 101 to make a decision about whether the initialization is to be executed or not.

Further, the CPU 101 of the information processing equipment 100 has functions of controlling the operation status (the normal mode or the power saving mode) of the xDSL modem 110a and the execution of the initialization according to an interruption signal input from the xDSL modem 110a. These functions are achieved by loading a predetermined program held in a storage onto a memory 102, and executing these functions, like other functions.

Figure 9:
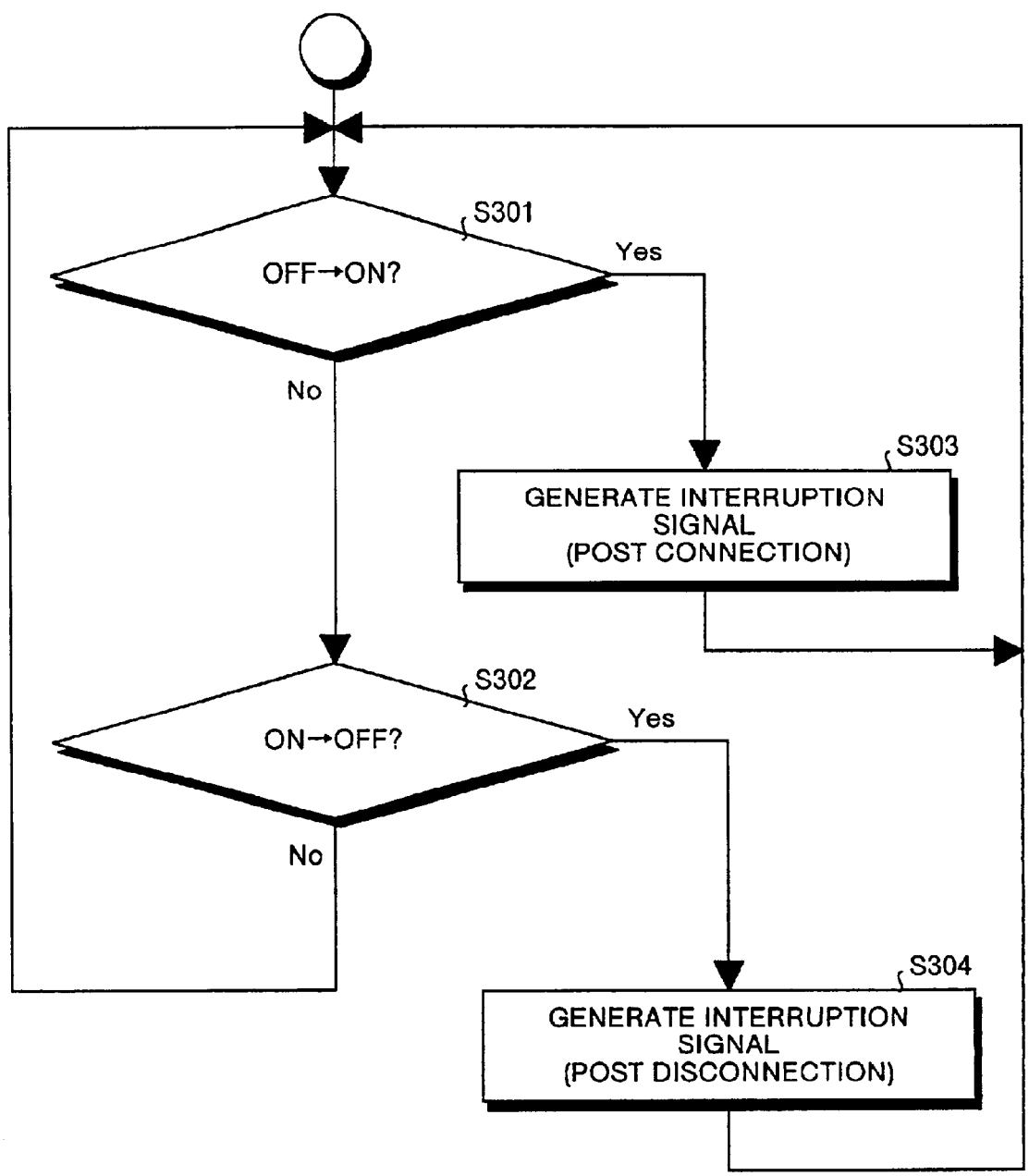
FIG. 9 is a flowchart showing a monitoring operation of the xDSL modem for monitoring a connection/disconnection operation.

The operation will be explained next. First, the operation of the xDSL modem 110 will be explained, particularly, the operation of monitoring a physical connection/ disconnection of the communication line 150 to/from the connector 130 will be explained with reference to FIG. 9.

The PCI interface 112a keeps monitoring a physical connection/disconnection of the communication line 150 to/from the connector 130, based on the status (ON/OFF) of the switch 131 (steps S301 and S302).

When the communication line 150 has been connected, the status of the switch 131 changes from OFF to ON. When the PCI interface 112a has detected this change in the status, the process proceeds to step S303. At step S303, the PCI interface 112a generates an interruption signal (the connection post) that shows that a connection operation has been carried out. Thereafter, the process returns to step S301, and a similar processing is repeated.

On the other hand, when the communication line 150 connected so far has been disconnected, the status of the switch 131 changes from ON to OFF. The PCI interface 112a detects this, and the process proceeds to step S304. At step S304, the PCI interface 112a generates an interruption signal (the disconnection post) that shows that a disconnection operation has been carried out. Thereafter, the process returns to step S301, and a similar processing is repeated.

The interruption signals (the connection post and the disconnection post) generated in this way are input to the CPU 101 through the PCI bus 108 and the like. As the PCI interface 112a is always being supplied with power, the PCI interface 112a continues this monitoring operation regardless of the operation mode.

Figure 10:
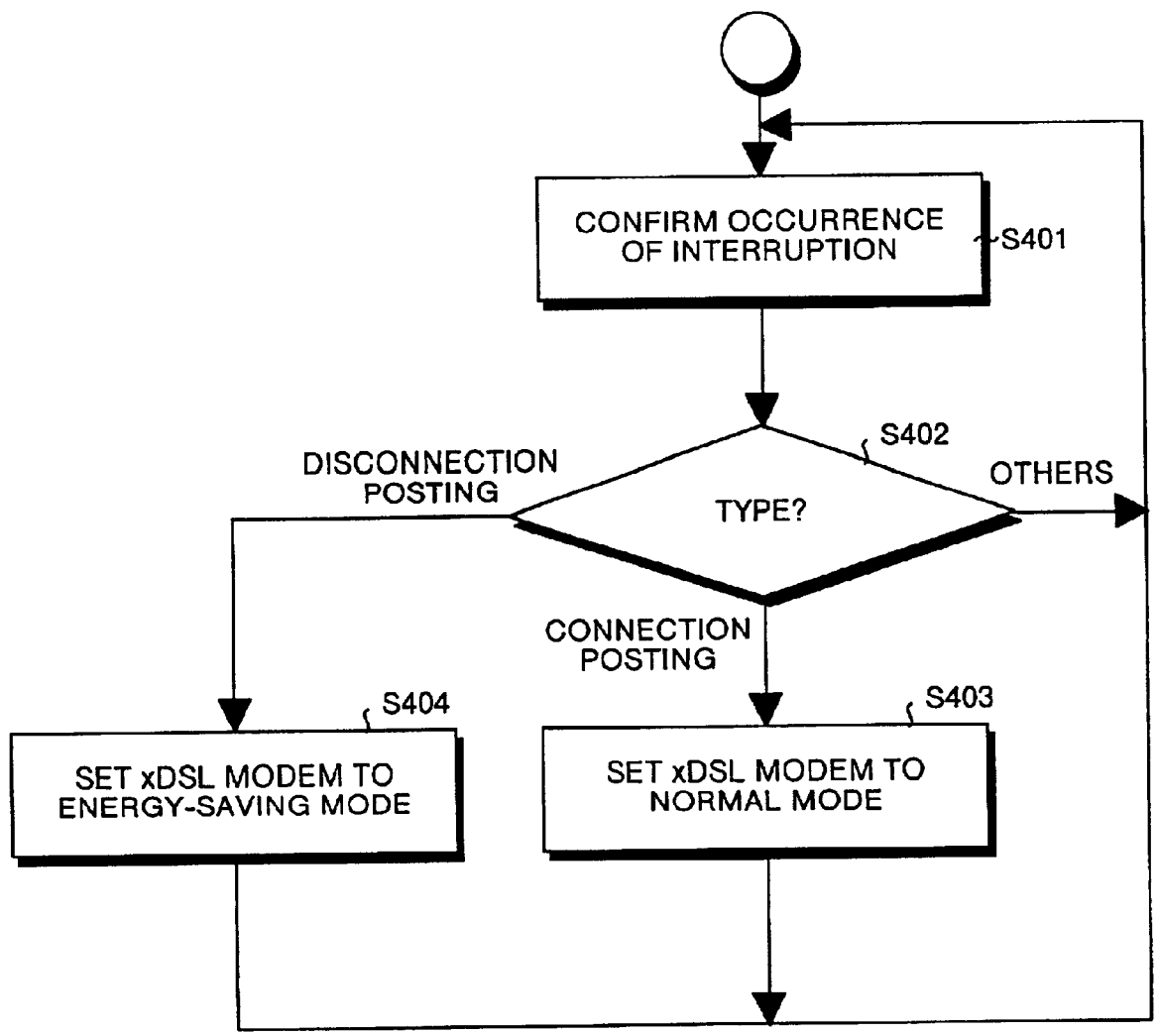
FIG. 10 is a flowchart showing an operation for responding to an interruption signal.

Next, the operation of the CPU 101 that has received the interruption signals from the PCI interface 112a will be explained with reference to FIG. 10. This processing operation shown in FIG. 10 is always continued to be carried out in parallel with the communication establishment processing (corresponding to the processing at step S102 in FIG. 5), unlike the connection decision processing (FIG. 6) of the first embodiment.

During the operation, the CPU 101 keeps confirming whether an interruption has occurred or not (step S401). When an interruption has occurred, the CPU 101 makes a decision on the contents (type) of this interruption (step S402).

When the interruption signal is a connection post from the xDSL modem 110 as a result of the decision made at step S402, the process proceeds to step S403. At step S403, the CPU 101 shifts the xDSL modem 110 to the normal mode. The CPU 101 executes this shifting by transmitting a predetermined control signal to the xDSL modem 110 through the PCI bus 108 and the like, and setting the contents of filter setting registers 115a and 115b to a predetermined value respectively. Further, the CPU 101 starts a program for carrying out a communication path establishment processing. Based on this, although not shown in FIG. 10, a processing corresponding to the processing at step S102 in FIG. 5 is started.

On the other hand, when the interruption signal is a disconnection post from the xDSL modem 110 as a result of the decision made at step S402, the process proceeds to step S404. At step S404, the CPU 101 shifts the xDSL modem 110 to the power saving mode. Further, the CPU 101 halts the execution of the program for executing the initialization processing. Although not shown in FIG. 1, when the process has reached step S404 during a communication path establishment processing like the initialization or during a data communication, the communication path establishment processing is inevitably aborted and is processed as an error. After steps S403 and S404, the process returns to step S401, and a similar processing is repeated.

As explained above, according to the present embodiment, a physical connection/disconnection operation of the communication line 150 is detected. Only when the communication line 150 has been physically connected, the initialization operation and the like are carried out, with the setting of the whole xDSL modem 110 to the operation status (the normal mode). When the communication line 150 has been disconnected, each part of the xDSL modem 110 is halted (the power saving mode). Therefore, it is possible to suppress wasteful power consumption without losing the advantage of the always on access. This effect is particularly effective for the information processing equipment that is considered to be in the unconnected status during an overwhelming long period of time, and that is operated based on batteries in many cases.

In the present embodiment, for the sake of the convenience of the structure of the equipment, the switch 131 for detecting the insertion of the jack of the communication line 150 is provided in the connector 130. On the other hand, the circuit for monitoring a status of this switch 131 is provided in the PCI interface 112. However, it is needless to mention that these units can be integrally structured.

In the present embodiment, a connection status is detected mechanically, and the information own to each type of xDSL modem, like the reference value in the first embodiment, is not necessary. Therefore, the general applicability of the driving software of the xDSL modem is not lost in applying the structure of the present embodiment.

Figure 11:
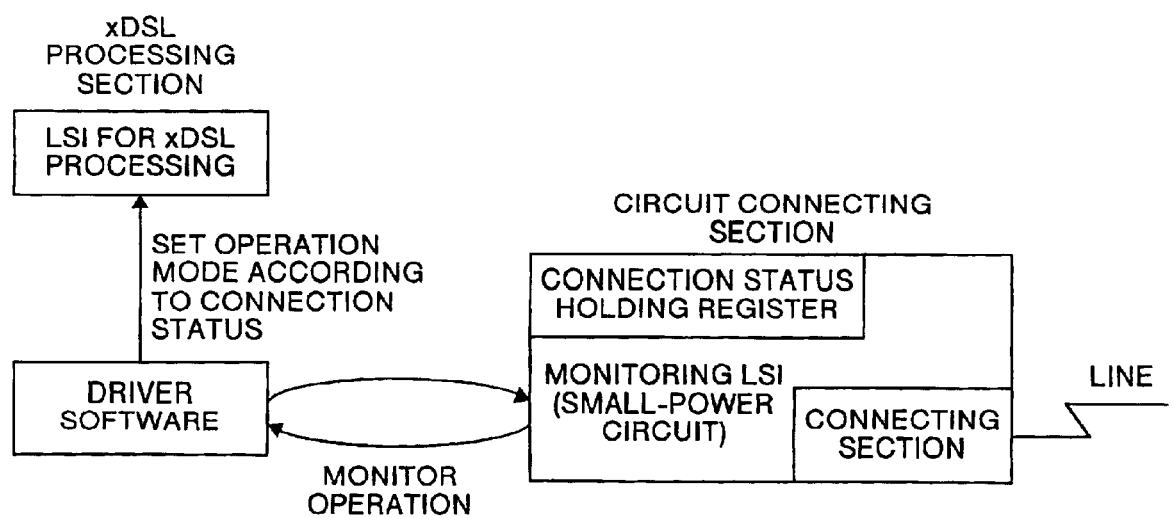
FIG. 11 is a diagram showing a concept of a third embodiment of the present invention.

The information processing equipment relating to a third embodiment of the present invention is an information processing equipment equipped with an xDSL modem, like in the second embodiment. In the third embodiment, a physical connection status (connected/unconnected) of a communication line 150 to a connector 130 is detected. When the communication line 150 has not been connected to the connector 130 as a result of this detection (the unconnected status), the operation of each part of the xDSL modem is halted to decrease power consumption. As shown in FIG. 11, in the third embodiment, this connection status (connected/unconnected) is detected by an exclusive switch 131 provided in a connector 130a. This will be explained in detail below. Differences of this embodiment from the second embodiment will be mainly explained below. Portions having similar functions and structures to those of the second embodiment are attached with like reference numbers, and their explanation will be omitted.

Figure 12:
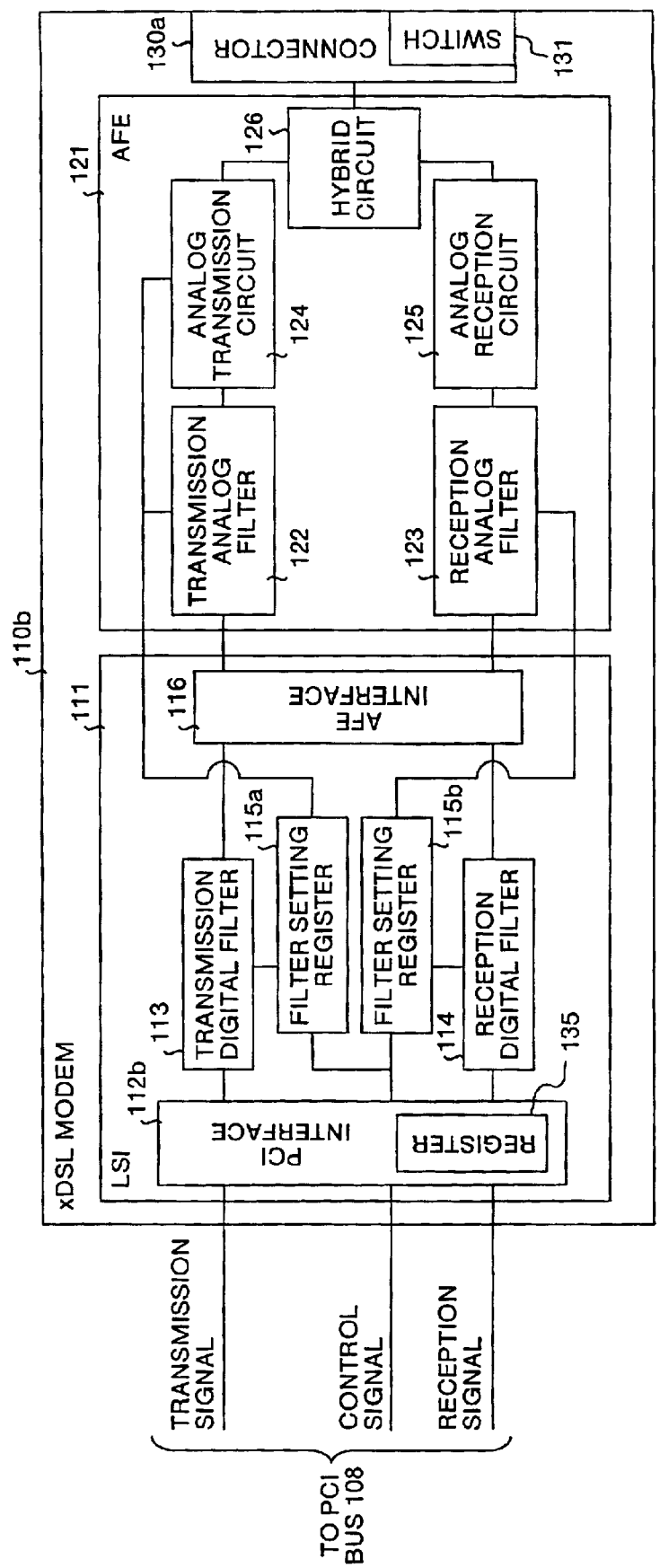
FIG. 12 is a diagram showing an internal structure of an xDSL modem in the third embodiment of the present invention.

FIG. 12 shows an internal structure of an xDSL modem 110b according to the third embodiment. PCI interface 112b includes register 135 for storing information on the status of the switch 131. The PCI interface 112b is structured to rewrite the contents of the register 135 each time when the status (ON/OFF) of the switch 131 has changed. CPU 101 of an information processing equipment 100 can read the contents of the register 135 through PCI 108 bus and the like. The contents of the register 135 are used for the CPU 101 to make a decision on the connection status.

The CPU 101 of the information processing equipment 100 has a function of confirming the contents of the register 135, and setting and changing the status of the xDSL modem 110 according to a result of this confirmation. This function is achieved by loading a predetermined program held in a storage onto a memory 102 and executing this function, like other functions.

Figure 13:
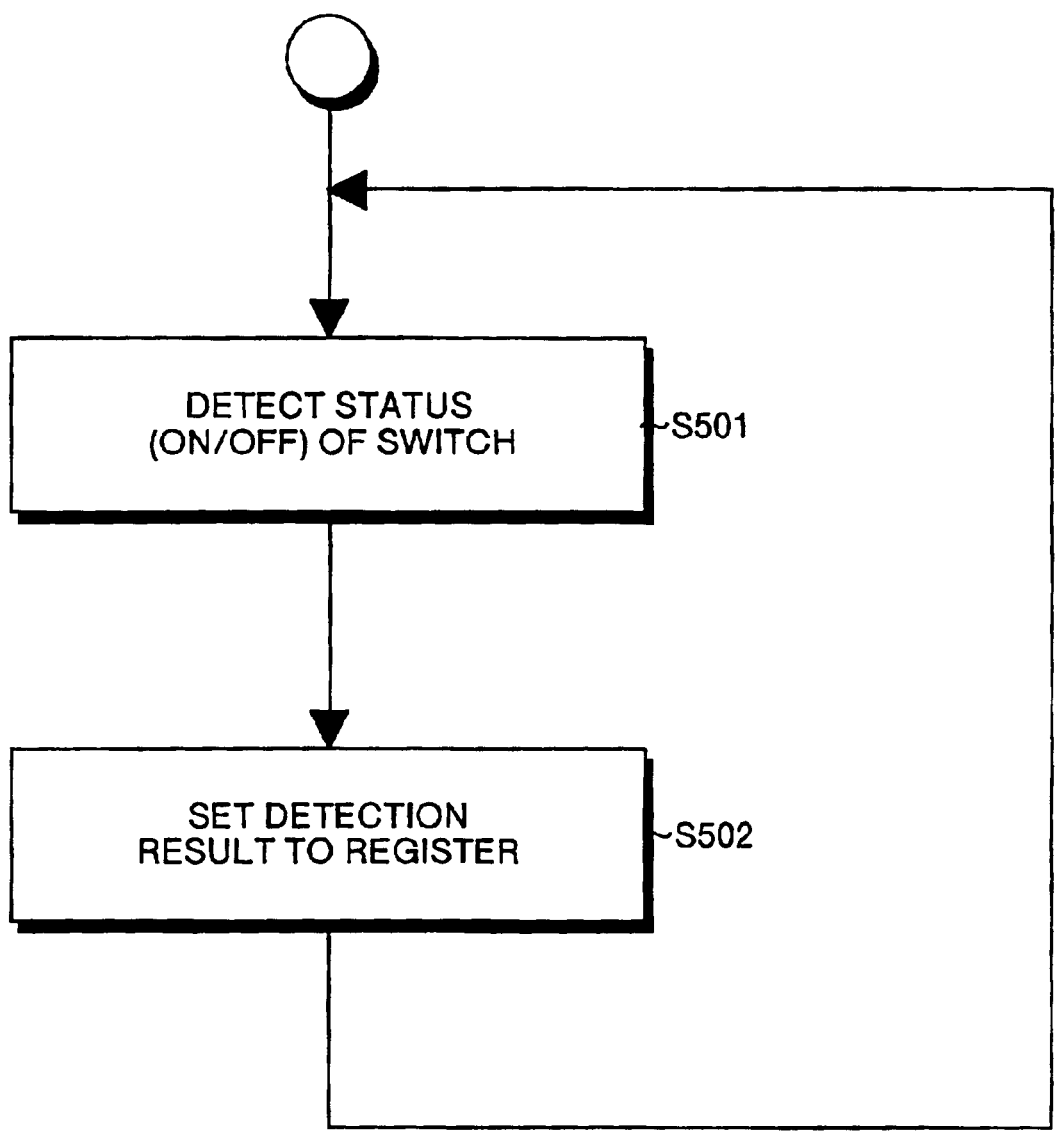
FIG. 13 is a flowchart showing a detection operation of the xDSL modem for detecting a connection status (connected/unconnected)

The operation will be explained next. First, the operation of the xDSL modem 110b for detecting a physical connection/disconnection (connected/unconnected) of the communication line 150 to/from the connector 130a will be explained with reference to FIG. 13.

The PCI interface 112b of the xDSL modem 110 detects a status (ON/OFF) of the switch 131 (step S501). Then, the PCI interface 112b sets a value according to a result of this detection to the register 135 (step S502). Thereafter, the process returns to step S501, and a similar processing is repeated. As power is always being supplied to the PCI interface 112b, this operation is always being repeated regardless of the operation mode.

Figure 14:
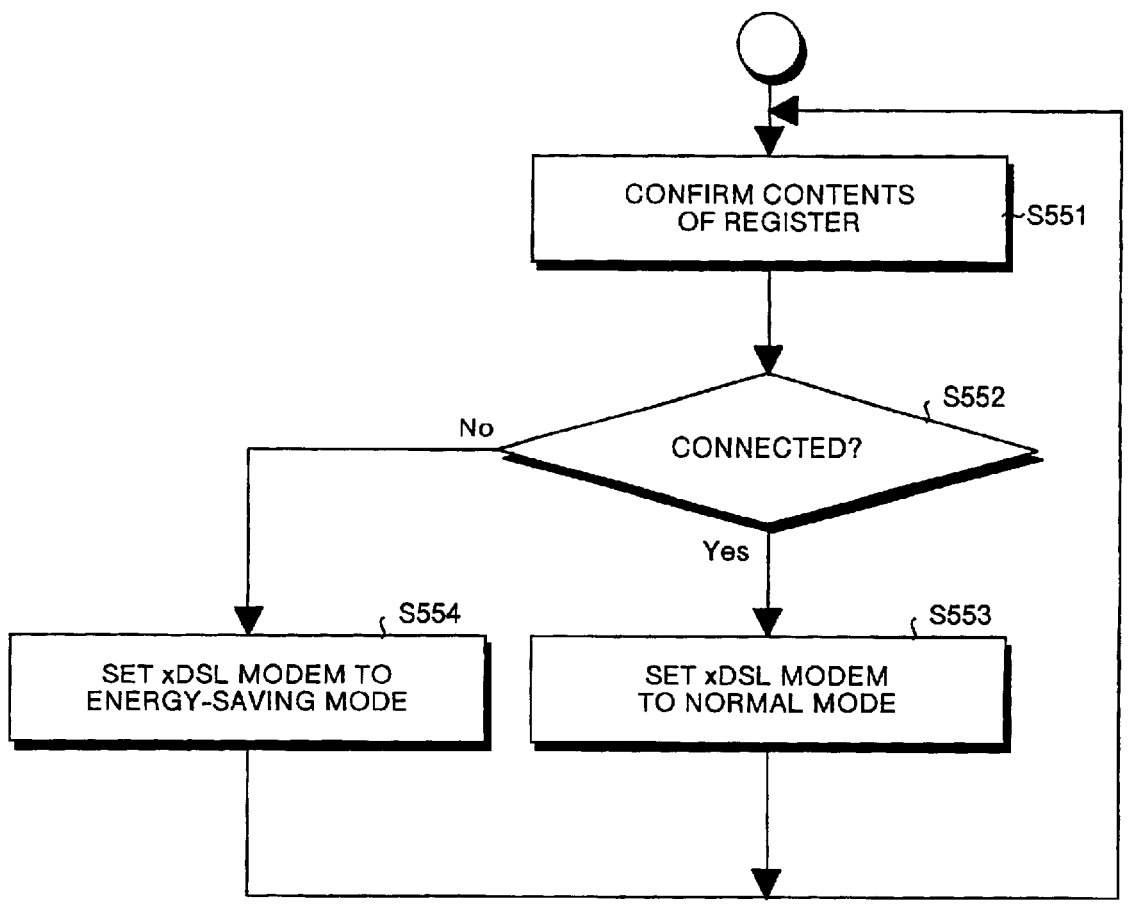
FIG. 14 is a flowchart showing a processing of a setting of an operation mode corresponding to a connection status.

The operation mode setting processing according to the connection status will be explained with reference to FIG. 14. This processing operation shown in FIG. 14 is always continued to be carried out in parallel with the communication establishment processing (corresponding to the processing at step S102 in FIG. 5) and the data communication (corresponding to the processing at step S103 in FIG. 5), unlike the connection decision processing (FIG. 5) of the first embodiment.

The CPU 101 reads out the contents of the register 135 of the xDSL modem 110 (step S551). Then, the CPU 101 makes a decision on the connection status (connected/unconnected) based on the read contents (step S552). When a connection has been established as a result of the decision made, the process proceeds to step S553. At step S553, the CPU 101 shifts the xDSL modem 110 to the normal mode. The CPU 101 executes this shifting by transmitting a predetermined control signal to the xDSL modem 110 through the PCI bus 108 and the like, and setting the contents of filter setting registers 115a and 115b to a predetermined value respectively. When the connection mode has always been the normal mode, the CPU 101 maintains this status, and does not change the operation mode.

Further, the CPU 101 starts a program for carrying out the initialization not shown in the drawing, and executes the processing corresponding to the processing at step S102 shown in FIG. 5.

When the connection status has been the unconnected status as a result of the decision made at step S552, the process proceeds to step S554. At step S554, the CPU 101 shifts the xDSL modem 110 to the power saving mode. Although not shown in FIG. 14, when the process has reached step S554 during the initialization or during a data communication, the CPU 101 interrupts the initialization or the like, and handles this processing as an error. After step S553 or step S554, the CPU 101 returns to step S551.

As explained above, according to the present embodiment, a physical connection status (connected/unconnected) of the communication line 150 is detected. Only when the communication line 150 has been physically connected, the initialization operation and the like are carried out, with the setting of the whole xDSL modem 110 to the operation status (the normal mode). When the communication line 150 has been in the unconnected status, each part of the xDSL modem 110 is halted (the power saving mode). Therefore, it is possible to suppress wasteful power consumption without losing the advantage of the always on access. This effect is particularly effective for the information processing equipment that is considered to be in the unconnected status during an overwhelming long period of time, and that is operated based on batteries in many cases.

The information processing equipment relating to a fourth embodiment of the present invention is an information processing equipment equipped with an xDSL modem. In the fourth embodiment, when a communication path has not been able to be established (an error occurs) after repeating the initialization by a predetermined number (a prescribed number Rmax), the xDSL modem is shifted to the power saving mode. Particularly, in the present embodiment, the prescribed number Rmax is set according to the contents of an error and a status of the power source of an information processing equipment 100, thereby to reduce power consumption. This will be explained in detail below.

A basic structure of the information processing equipment 100 is similar to that of the first embodiment. Functions achieved by the CPU 101 and others are partly different from those of the first embodiment. Differences of this embodiment from the first embodiment will be mainly explained below. Portions having similar functions and structures to those of the first embodiment are attached with like reference numbers, and their explanation will be omitted.

The communication function realized through the execution of various programs by the CPU 101 has further the following characteristics. That is, when a communication path has not been able to be established (an error occurs) after repeating the initialization by a predetermined number (the prescribed number Rmax), the xDSL modem is shifted to the power saving mode. In this case, this prescribed number Rmax is set according to the contents of an error and a status of the power source of the information processing equipment 100, as shown in FIG. 15. When the error has occurred in the software processing in the external power source mode, the prescribed number Rmax is set to L. When the error has occurred due to no response from the other side modem in the external power source mode, the prescribed number Rmax is set to L. When the error has occurred in the software processing in the internal power source mode, the prescribed number Rmax is set to M. When the error has occurred due to no response from the other side modem in the internal power source mode, the prescribed number Rmax is set to N. In this case, the size relationship is N<M<L. This size relationship has been determined by taking into consideration a possibility of an establishment of a communication path. In the present embodiment, the size of L is set to 10, the size of M is set to 8, and the size of N is set to 5. In order to realize this communication function, the information processing equipment 100 has, as a matter of course, two functions of a power source status decision function and an error identification function, as follows.

The error identification function is a function of identifying a type of error that has occurred at the time of the initialization. In the present embodiment, it is possible to identify the error contents by dividing the errors into an error due to no answer from the other side modem (NAERR) and an error in the software processing (ERR).

The power source status decision function is a function of identifying a status of the power source of the information processing equipment (an external power source mode/an internal power source mode). The external power source mode is a status that power is being supplied to the information processing equipment 100 from an external power source separately prepared through a power source terminal of the information processing equipment 100. As external power sources, there are a commercial 100 V power source supplied through an AC adapter, and a private electric generator. Further, a power supplied through a cigar plug socket is also an external power source. On the other hand, the internal power source mode is a status that power is not being supplied from the external power source. In the internal power source mode, the information processing equipment 100 operates based on the power stored in batteries provided inside the information processing equipment 100 itself. The function of deciding the power source status has been a known technique, and therefore, this will be not explained in detail.

Figure 16:
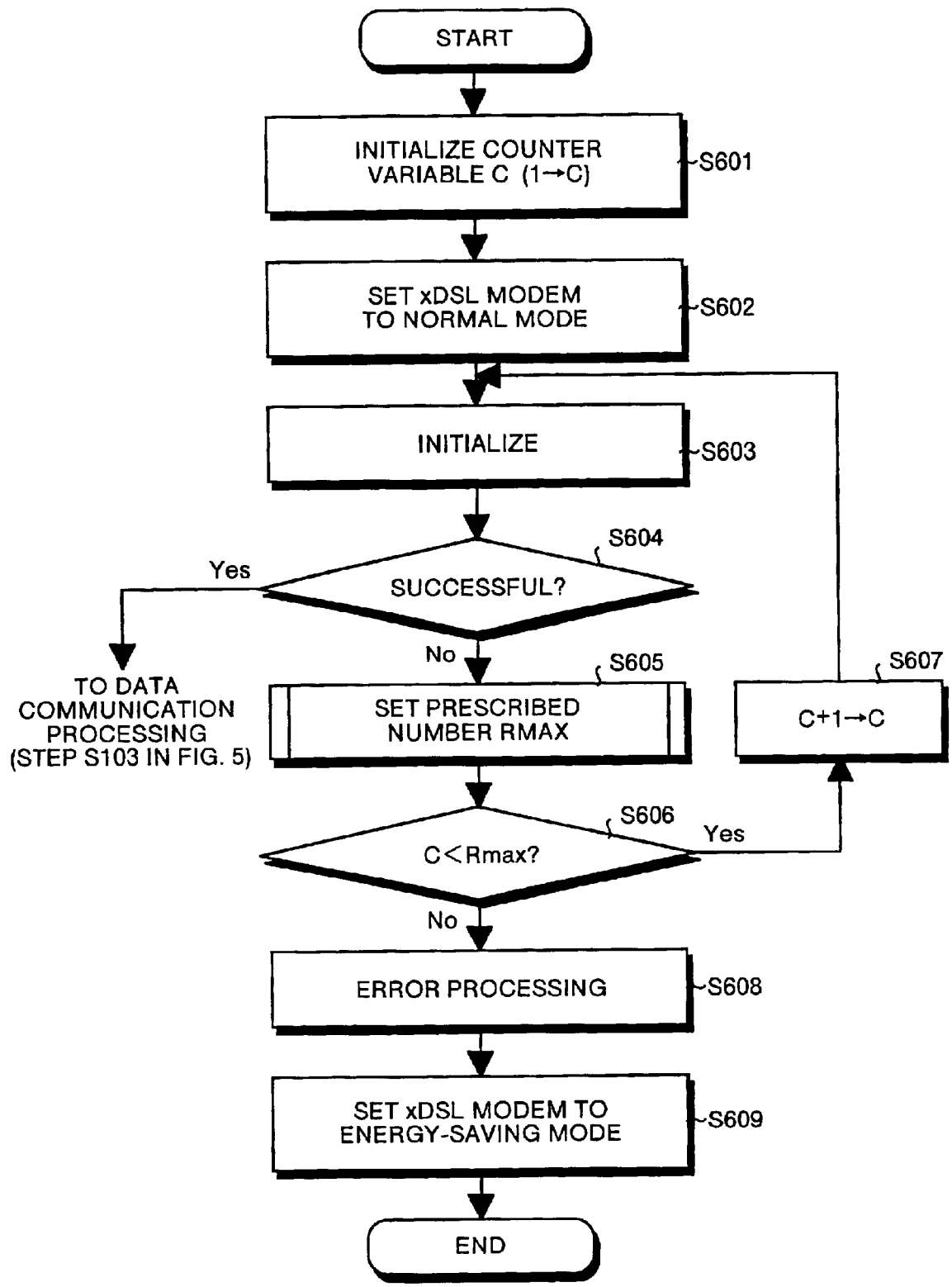
FIG. 16 is a flowchart showing a communication path establishment processing.

The operation will be explained next. First, the communication path establishment processing will be explained in detail with reference to FIG. 16. The processing shown in FIG. 16 is carried out at a stage corresponding to step S102 shown in FIG. 5.

The CPU 101 first initializes (=1) a counter variable C of a counter that counts the number of the initialization carried out (step S601). The CPU 101 then sets the status of an xDSL modem 110 to the normal mode (step S602). Thereafter, the CPU 101 executes the initialization while controlling the xDSL modem 110 and the like (step S603). The CPU 101 makes a decision on the success/failure of this initialization (step S604). When the initialization has been a success as a result of the decision made, the process proceeds to a data communication processing (corresponding to step S103 shown in FIG. 5).

On the other hand, when the initialization has been a failure (an error) as a result of the decision made at step S604, the CPU 101 sets the prescribed number Rmax (step S605). The prescribed number Rmax is set only after the first initialization. It is not necessary to set again the prescribed number Rmax after a second initialization and thereafter. The processing at step S605 will be explained in further detail later with reference to FIG. 17.

After step S605, the CPU 101 makes a decision about whether the variable C has reached the prescribed number Rmax or not (step S606). When the variable C has not reached the prescribed number Rmax as a result of the decision made, the CPU 101 adds 1 to the variable C (step S607), and then returns to step S603 again. On the other hand, when the variable C has reached the prescribed number Rmax as a result of the decision made, the CPU 101 carries out a predetermined error processing by regarding that the establishment of a communication path has been a failure (step S608). Then, the CPU 101 shifts the xDSL modem 110 to the power saving mode (step S609), and finishes this processing.

Figure 17:
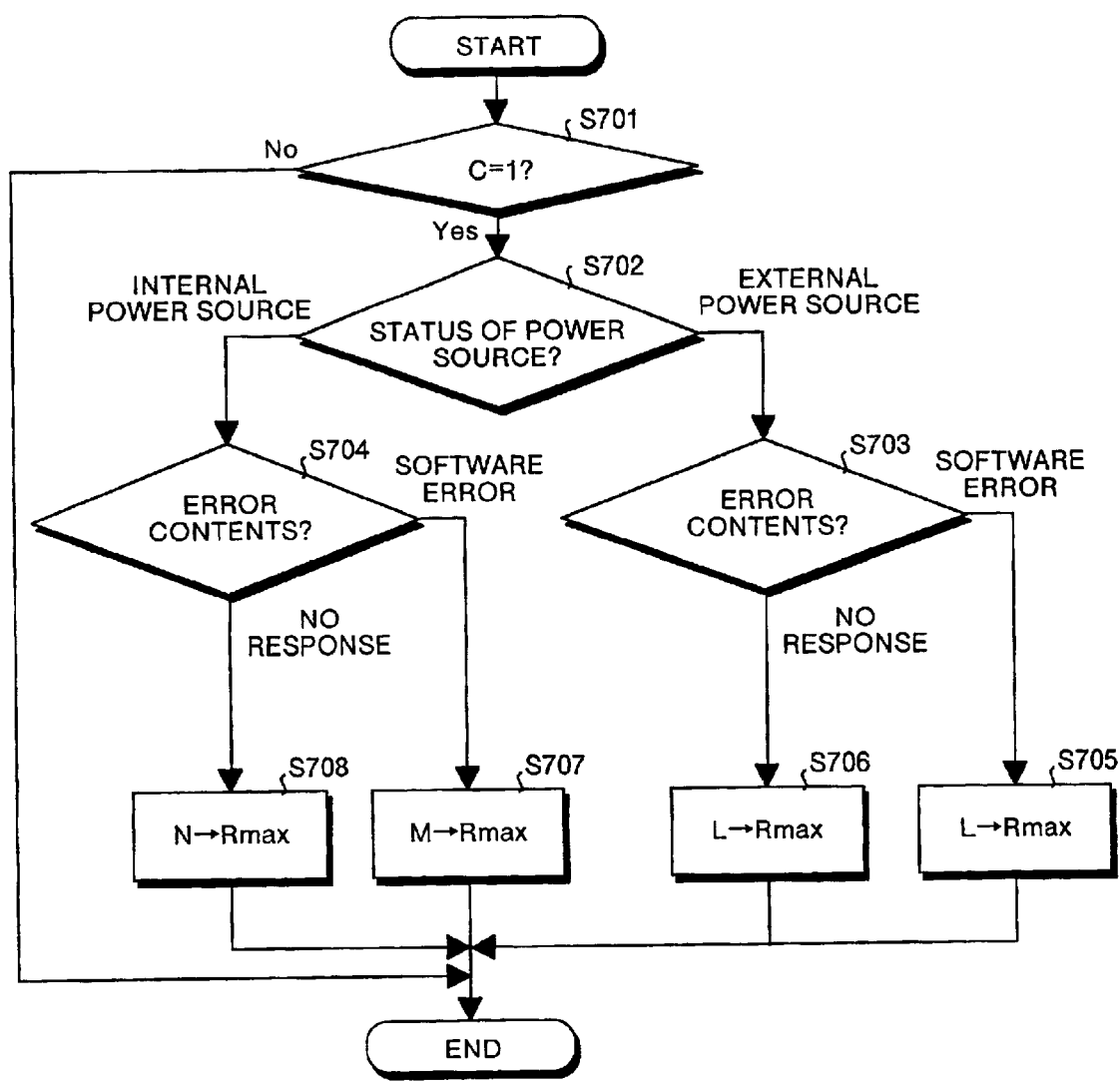
FIG. 17 is a flowchart showing a processing of setting a prescribed number.

The prescribed number setting processing will be explained with reference to FIG. 17. This processing is executed at step S605 shown in FIG. 16. First, the CPU 101 makes a decision about whether the initialization carried out immediately before is a first initialization or not, based on a value of the variable C (step S701). When the initialization carried out immediately before is not the first initialization, the CPU 101 finishes this processing. On the other hand, when the initialization carried out immediately before is the first initialization, the CPU 101 makes a decision on the power source status (the external power source mode/the internal power source mode), and on the error contents (steps S702 to S704). Then, the CPU 101 sets the prescribed number Rmax according to a result of the decision made (steps S705 to S708).

In other words, when the error contents are an error in the software processing in the external power source mode, the CPU 101 sets the prescribed number Rmax to L (ten times in the present embodiment) (step S705). When the error contents are an error due to no response from the other side modem in the external power source mode, the CPU 101 sets the prescribed number Rmax to L (ten times in the present embodiment) (step S706). When the error contents are an error in the software processing in the internal power source mode, the CPU 101 sets the prescribed number Rmax to M (eight times in the present embodiment) (step S707). When the error contents are an error due to no response from the other side modem in the internal power source mode, the CPU 101 sets the prescribed number Rmax to N (five times in the present embodiment) (step S708). Thereafter, the processing is finished, and the process proceeds to step S606 shown in FIG. 16.

As explained above, in the present embodiment, the number of repeating the initialization (the prescribed number Rmax) is set according to the possibility of the establishment of a communication path, that is, according to the error contents and the power source status. Thus, it becomes possible to suppress wasteful power consumption without losing the advantage of the always on access. Particularly, in the case of the portable information processing equipment like a notebook-type computer, it is possible to effectively reduce power consumption as it is considered that this equipment is in the line unconnected status during an overwhelmingly long period of time. Further, in many cases, the notebook-type computer is operated based on batteries as its power source. Therefore, the reduction in power consumption leads to the elongation of the operation time, which is particularly effective.

Detailed values of the prescribed number Rmax are not limited to the above example. Further, the size relationship (N<M<L) of the prescribed numbers classified based on the power source status and the power source contents is not limited to the above example either. As the possibility of the communication path establishment can be considered from various viewpoints, it is also possible to employ other method of setting, that is, the size relationship of the prescribed numbers in each case. For example, the prescribed numbers can be changed according to the error contents (errors in the software processing/errors due to no response from the other side modem) in the external power source mode.

Cases are divided based on the types of power source (the internal power source/the external power source) in the present embodiment. However, it is also possible to divide the cases based on the remaining capacity of electricity stored in batteries that constitute the internal power source, as one example.

The information processing equipment relating to a fifth embodiment of the present invention is an information processing equipment equipped with an xDSL modem. In the fifth embodiment, when the operation mode has once shifted to the power saving mode, the initialization is tried again after a predetermined period of time (a waiting period) in order to realize the always on access. Particularly, in the fifth embodiment, the waiting period is set according to the contents of an error and a status of the power source of an information processing equipment 100, thereby to reduce power consumption. This will be explained in detail below.

A basic structure of the information processing equipment 100 is similar to that of the first embodiment. Functions achieved by the CPU 101 and others are partly different from those of the first embodiment. Differences of this embodiment from the first embodiment will be mainly explained below. Portions having similar functions and structures to those of the first embodiment are attached with like reference numbers, and their explanation will be omitted.

The communication function realized through the execution of various programs by the CPU 101 has further the following characteristics. That is, when a communication path has not been able to be established after repeating the initialization by a predetermined number, the xDSL modem is shifted to the power saving mode. In this case, when the operation mode has once shifted to the power saving mode, the initialization is tried again after a predetermined period of time (a waiting period T) in order to establish a communication path after this shifting. In this case, the waiting period T is set according to the contents of an error and a status of the power source of the information processing equipment 100 as shown in FIG. 18.

When the error has occurred in the software processing in the external power source mode, the waiting period T is set to a short time t1. When the error has occurred due to no response from the other side modem in the external power source mode, the waiting period T is set to a long time t2. When the error has occurred in the software processing in the internal power source mode, the waiting period T is set to the time t2. When the error has occurred due to no response from the other side modem in the internal power source mode, the waiting period T is set to the time t2. In this case, the size relationship is t1<t2. This size relationship has been determined by taking into consideration a possibility of an establishment of a communication path. In the present embodiment, the size of t1 is set to 30 seconds, and the size of t2 is set to 3 minutes.

In order to realize this communication function, the information processing equipment 100 has, as a matter of course, a power source status decision function and an error identification function, as follows. These functions are similar to those of the fourth embodiment, and their explanation will be omitted.

Figure 19:
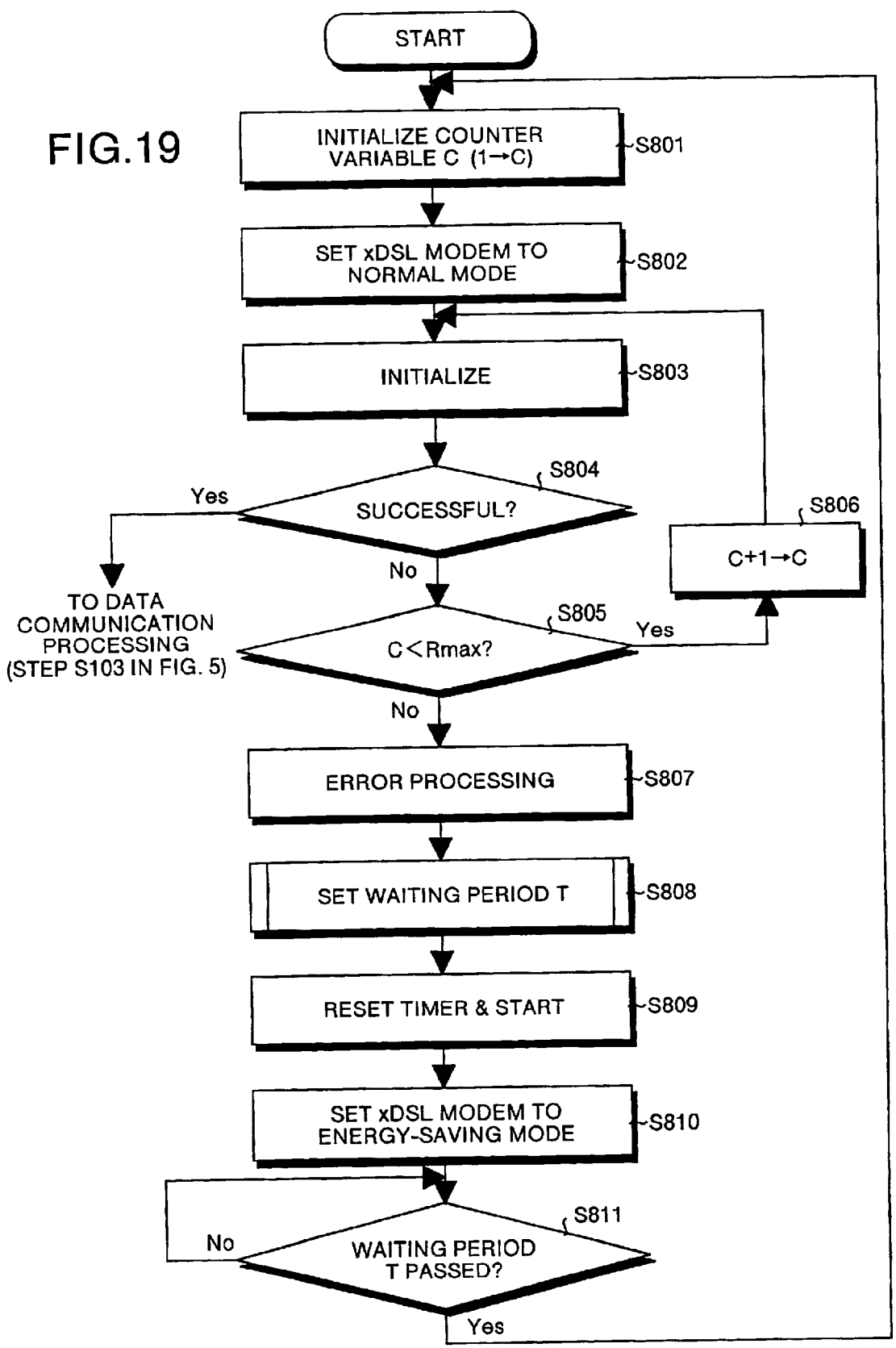
FIG. 19 is a flowchart showing a communication path establishment processing.

The operation will be explained next. The communication path establishment processing will be explained in detail with reference to FIG. 19. The processing shown in FIG. 19 is carried out at a stage corresponding to step S102 shown in FIG. 5.

The CPU 101 first initializes (=1) a counter variable C of a counter that counts the number of the initialization carried out (step S801). The CPU 101 then sets the status of an xDSL modem 110 to the normal mode (step S802). Thereafter, the CPU 101 executes the initialization while controlling the xDSL modem 110 and the like (step S803). The CPU 101 makes a decision on the success/failure of this initialization (step S804). When the initialization has been a success as a result of the decision made, the process proceeds to a data communication processing (corresponding to step S103 shown in FIG. 5).

On the other hand, when the initialization has been a failure (an error) as a result of the decision made at step S804, the CPU 101 makes a decision about whether or not a variable C has reached a prescribed number Rmax separately determined (step S805). When the variable C has not reached the prescribed number Rmax as a result of the decision made, the CPU 101 adds 1 to the variable C (step S806), and then returns to step S803 again. On the other hand, when the variable C has reached the prescribed number Rmax as a result of the decision made, the CPU 101 makes a decision that the establishment of a communication path has been a failure. Then, the process proceeds to step S807.

At step S807, the CPU 101 carries out a predetermined processing. Then, the CPU 101 sets a waiting period T (steps S808). This waiting period T is set according to the power source status and the error contents. The setting of this waiting period T will be explained in detail later with reference to FIG. 20.

Thereafter, the CPU 101 resets a timer, and starts time counting (step S809). The CPU 101 shifts the xDSL modem 110 to the power saving mode (step S810).

Then, the CPU 101 becomes in the waiting status, and waits for a lapse of the waiting period T (step S811). The CPU 101 makes a decision about whether the waiting period T has passed or not, based on the timer started at step S809. After the lapse of the waiting period T, the process returns to step S801. Then, a similar processing is repeated.

Figure 20:
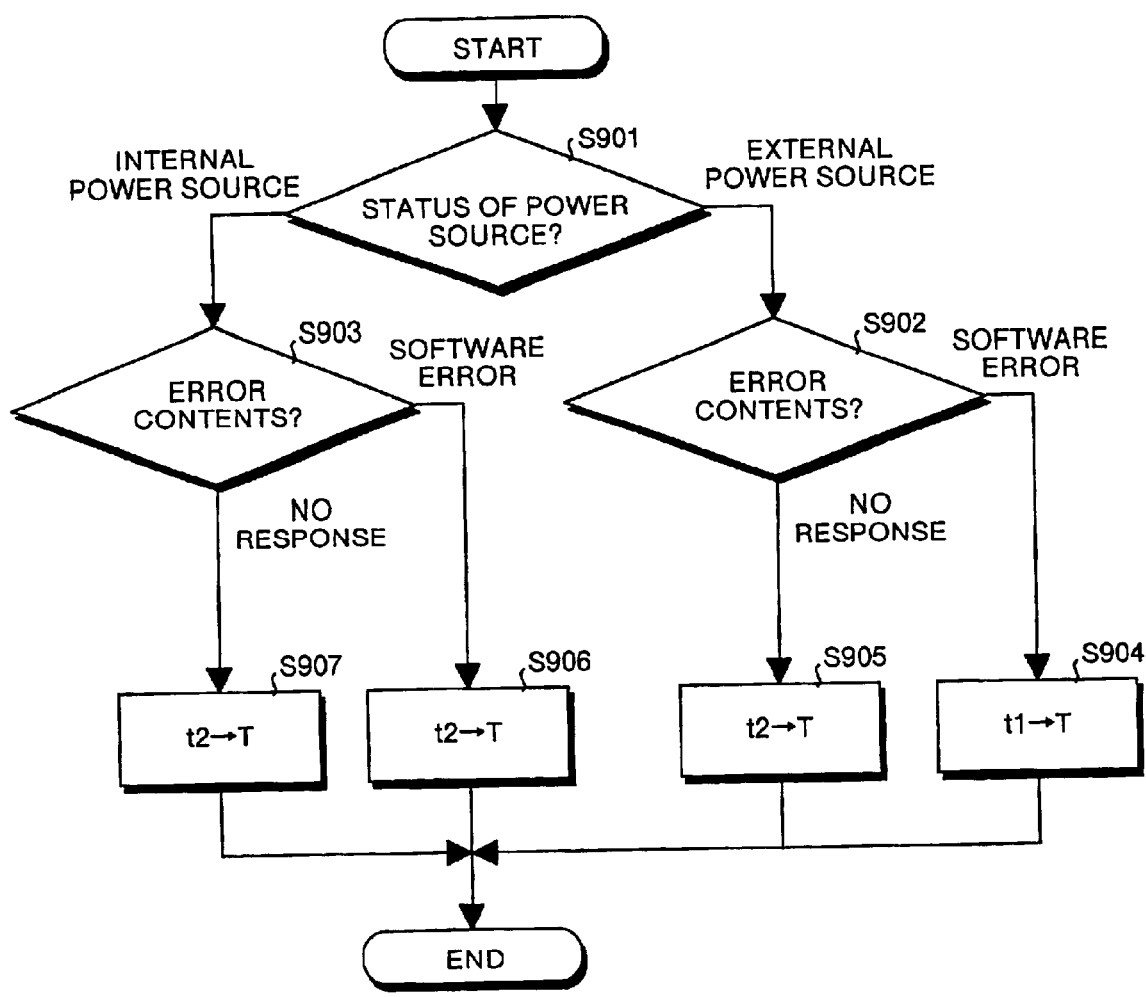
FIG. 20 is a flowchart showing a processing of setting a waiting period.

The processing of setting the waiting period T will be explained with reference to FIG. 20. This processing is executed at step S808 shown in FIG. 19. First, the CPU 101 makes a decision on the power source status (the external power source mode/the internal power source mode), and on the error contents (steps S901 to S903). Then, the CPU 101 sets the waiting period T according to a result of the decision made (steps S904 to S907). In other words, when the error contents are an error in the software processing in the external power source mode, the CPU 101 sets the waiting period T to t1 (30 seconds in the present embodiment) (step S904). When the error contents are an error due to no response from the other side modem in the external power source mode, the CPU 101 sets the waiting period T to t2 (three minutes in the present embodiment) (step S905). When the error contents are an error in the software processing in the internal power source mode, the CPU 101 sets the waiting period T to t2 (step S906). When the error contents are an error due to no response from the other side modem in the internal power source mode, the CPU 101 sets the waiting period T to t2 (step S907). After step S904 to step S907, the processing is finished, and the process shifts to step S809 shown in FIG. 19.

As explained above, in the present embodiment, the time interval (the waiting period) for trying the next initialization is set according to the possibility of the establishment of a communication path, that is, according to the error contents and the power source status. Thus, it becomes possible to suppress wasteful power consumption without losing the advantage of the always on access. Particularly, in the case of the portable information processing equipment like a notebook-type computer, it is possible to effectively reduce power consumption as it is considered that this equipment is in the line unconnected status during an overwhelmingly long period of time. Further, in many cases, the notebook-type computer is operated based on batteries as its power source. Therefore, the reduction in power consumption leads to the elongation of the operation time, which is particularly effective.

A program for achieving each of the above-described functions may be recorded on a computer-readable recording medium. In this case, a computer system (the information processing equipment 100 in the above embodiment) reads the program recorded on the recording medium based on the needs, and executes this program, thereby to achieve the above-described various kinds of processing.

The "computer system" includes hardware like the OS and the peripheral units. The "computer-readable recording medium" includes a recording medium that removable medium such as a floppy disk, magnetic optical disk, ROM and CD-ROM; recording device such as hard disk that is built-in to computer system. The "computer-readable recording medium" includes a recording medium that dynamically holds a program for a short period of time like a communication line that transmits the program through a network like the Internet and through a communication line like a telephone line. The "computer-readable recording medium" also includes a recording medium that holds a program for a constant period of time like a volatile memory inside the computer system that becomes a server or a client. Further, the program may be a one program that achieves a part of the above-described functions, or a combination of programs recorded on the computer system for achieving these functions.

In achieving the present invention, it is not necessary to have all the structures of the above-described embodiments. The equipment may have only a part of the structures within the scope capable of achieving the object of the present invention. On the other hand, the equipment may have a suitable combination of the structures of the above embodiments. In the above embodiments, communications are carried out using the xDSL modem based on always on access. However, the application of the present invention is not limited to this assumption.

As explained above, according to the present invention, in a status that the communication line is not connected to the connector (the unconnected status), there is no possibility that a communication path is established at all. The execution of the initialization in the unconnected status is a waste of power. In order to avoid this, a decision is made about whether the communication line has been connected to the connector or not. The initialization is not carried out when it has been confirmed that the communication line has not been connected to the connector. Therefore, it is possible to avoid the wasting of power.

Further, according to the present invention, the prescribed number is determined according to the cause of a past failure in the initialization and/or the status of the power source at that time. Therefore, it is possible to suppress power consumption and it is also possible to obtain the convenience of maintaining the status of having a communication path established. It is possible to achieve both of them in high dimension.

Further, according to the present invention, the length of the waiting period is determined according to the cause of a past failure in the initialization and/or the status of the power source at that time. Therefore, it is possible to suppress power consumption and it is also possible to obtain the convenience of maintaining the status of having a communication path established. It is possible to achieve both of them in high dimension.

Further, according to the present invention, the detecting switch mechanically detects whether the communication line has been connected to the connector or not. The deciding circuit makes a decision on a connection status based on a result of the detection by the detecting switch. Then, the deciding circuit outputs a predetermined signal that shows the decision result to the communication control unit. The communication control unit can know whether the communication line has been connected or not, based on this signal. Therefore, data based on a machine type is not necessary for making a decision on the connection status. As a result, the general applicability of software is not lost.

Further, according to the present invention, the detecting switch mechanically detects whether the communication line has been connected to the connector or not. The deciding circuit makes a decision on a connection status based on a result of the detection by the detecting switch. Then, the deciding circuit stores a result of the decision into the memory. Therefore, the communication control unit can confirm a connection status of the communication line by making access to this memory. As a result, the general applicability of software is not lost.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information processing equipment that carries out a communication path establishment processing at the time when a power source is turned on, the information processing equipment comprising:
   a connector that is connected with a communication line based on the needs;
   a transmission/reception mechanism that transmits/receives data through said communication line connected to said connector;
   a connection status deciding unit that decides whether said communication line has been connected to said connector or not; and
   a control unit that controls said transmission/reception mechanism to carry out an initialization processing for establishing a communication path connected to said communication line,
   wherein said control unit controls not to carry out the initialization processing when it has been confirmed that said communication line has not been connected to said connector as a result of the decision made by said connection status deciding unit, and
   wherein said transmission/reception mechanism has a plurality of operation modes having different levels of power consumption, and when the initialization processing is not carried out based on the confirmation that said communication line has not been connected to said connector as a result of the decision made by said connection status deciding unit, said control unit shifts said transmission/reception mechanism to an operation mode in which power consumption is lower.

2. An information processing equipment that carries out a communication path establishment processing at the time when a power source is turned on, the information processing equipment comprising:
   a connector that is connected with a communication line based on the needs;
   a transmission/reception mechanism that transmits/receives data through said communication line connected to said connector;
   a connection status deciding unit that decides whether said communication line has been connected to said connector or not; and
   a control unit that controls said transmission/reception mechanism to carry out an initialization processing for establishing a communication path connected to said communication line,
   wherein said control unit controls not to carry out the initialization processing when it has been confirmed that said communication line has not been connected to said connector as a result of the decision made by said connection status deciding unit, and
   wherein said connection status deciding unit controls said transmission/reception mechanism to transmit a predetermined test signal, measures an echo of this test signal, and compares a size of energy of the measured echo with a predetermined reference value, and when the energy of the measured echo is larger than the reference value, said connection status deciding unit decides that said communication line has not been decided.

3. An information processing equipment that carries out a communication path establishment processing at the time when a power source is turned on, the information processing equipment comprising:
   a connector that is connected with a communication line based on the needs;
   a transmission/reception mechanism that transmits/receives data through said communication line connected to said connector;
   a connection status deciding unit that decides whether said communication line has been connected to said connector or not; and
   a control unit that controls said transmission/reception mechanism to carry out an initialization processing for establishing a communication path connected to said communication line,
   wherein said control unit controls not to carry out the initialization processing when it has been confirmed that said communication line has not been connected to said connector as a result of the decision made by said connection status deciding unit, and
   wherein said connection status deciding unit comprises a detecting switch that is provided on the connector and is turned ON or OFF corresponding to a physical connection or disconnection, respectively, of said communication line to said connector, and a deciding circuit that decides a connection status of said communication line based on a status of ON or OFF of the detecting switch.

4. A communication that tries to keep a status that a communication path is normally connected by suitably carrying out an initialization processing for establishing a communication path,
   wherein whether a communication line has been connected or not is confirmed, and when it has been confirmed that said communication line has not been connected, the initialization processing is not carried out, and
   wherein the confirmation is carried out such that a predetermined tone signal is transmitted, and an echo of this tone signal is measured, and when the size of energy of this echo is larger than a predetermined value, a decision is made that said communication line has not been connected.

5. A communication method that tries to keep a status that a communication path is normally connected by suitably carrying out an initialization processing for establishing a communication path,
   wherein whether a communication line has been connected or not is confirmed, and when it has been confirmed that said communication line has not been connected, the initialization processing is not carried out, and
   wherein the confirmation is carried out by monitoring a state of a switch that is provided on a connector through which the connection line is connected and that is turned ON or OFF corresponding to a physical connection or disconnection, respectively, of said communication line to said connector and deciding a connection state of said communication line based on a status of ON or OFF of the switch.

6. A computer readable medium for storing instructions, which when executed on a computer, causes the computer to realize a communication method that tries to keep a status that a communication path is normally connected by suitably carrying out an initialization processing for establishing a communication path, wherein whether a communication line has been connected or not is confirmed, and when it has been confirmed that said communication line has not been connected, the initialization processing is not carried out, and wherein the confirmation is carried out such that a predetermined tone signal is transmitted, and an echo of the tone signal is measured, and when the size of energy of the echo is larger than a predetermined value, a decision is made that said communication line has not been connected.

7. A computer program for causing the computer to realize a communication method that tries to keep a status that a communication path is normally connected by suitably carrying out an initialization processing for establishing a communication path, wherein whether a communication line has been connected or not is confirmed, and when it has been confirmed that said communication line has not been connected, the initialization processing is not carried out, and wherein the confirmation is carried out such that a predetermined tone signal is transmitted, and an echo of the tone signal is measured, and when the size of energy of the echo is larger than a predetermined value, a decision is made that said communication line has not been connected.

8. A communication method that tries to keep a status that a communication path is normally connected by suitably carrying out an initialization processing for establishing a communication path, wherein whether a communication line has been connected or not is confirmed, and when it has been confirmed that said communication line has not been connected, the initialization processing is not carried out, and wherein transmission/reception is performed in a plurality of operation modes having different levels of power consumption, and when the initialization processing is not carried out based on the confirmation that said communication line has not been connected, said transmission/reception is shifted to an operation mode in which power consumption is lower.

9. A computer readable medium for storing instructions, which when executed on a computer, causes the computer to realize a communication method that tries to keep a status that a communication path is normally connected by suitably carrying out an initialization processing for establishing a communication path, wherein whether a communication line has been connected or not is confirmed, and when it has been confirmed that said communication line has not been connected, the initialization processing is not carried out, and wherein the confirmation is carried out by monitoring a state of a switch that is provided on a connector through which the connection line is connected and that is turned ON or OFF corresponding to a physical connection or disconnection, respectively, of said communication line to said connector and deciding a connection state of said communication line based on a status of ON or OFF of the switch.

10. A computer readable medium for storing instructions, which when executed on a computer, causes the computer to realize a communication method that tries to keep a status that a communication path is normally connected by suitably carrying out an initialization processing for establishing a communication path, wherein whether a communication line has been connected or not is confirmed, and when it has been confirmed that said communication line has not been connected, the initialization processing is not carried out, and wherein transmission/reception is performed in a plurality of operation modes having different levels of power consumption, and when the initialization processing is not carried out based on the confirmation that said communication line has not been connected, said transmission/reception is shifted to an operation mode in which power consumption is lower.

11. A computer program for causing the computer to realize a communication method that tries to keep a status that a communication path is normally connected by suitably carrying out an initialization processing for establishing a communication path, wherein whether a communication line has been connected or not is confirmed, and when it has been confirmed that said communication line has not been connected, the initialization processing is not carried out, and wherein the confirmation is carried out by monitoring a state of a switch that is provided on a connector through which the connection line is connected and that is turned ON or OFF corresponding to a physical connection or disconnection, respectively, of said communication line to said connector and deciding a connection state of said communication line based on a status of ON or OFF of the switch.

12. A computer program for causing the computer to realize a communication method that tries to keep a status that a communication path is normally connected by suitably carrying out an initialization processing for establishing a communication path, wherein whether a communication line has been connected or not is confirmed, and when it has been confirmed that said communication line has not been connected, the initialization processing is not carried out, and wherein transmission/reception is performed in a plurality of operation modes having different levels of power consumption, and when the initialization processing is not carried out based on the confirmation that said communication line has not been connected, said transmission/reception is shifted to an operation mode in which power consumption is lower.

* * * * *

UNITED STATES PATENT AND TRADEMARK OFFICE
CERTIFICATE OF CORRECTION

PATENT NO. : 6,845,406 B2  Page 1 of 1
DATED : January 18, 2005
INVENTOR(S) : Masato Hori et al.

It is certified that error appears in the above-identified patent and that said Letters Patent is hereby corrected as shown below:

<u>Title page,</u>
Item [57], ABSTRACT,
Line 10, after "line" change "it" to -- is --.

Signed and Sealed this

Twelfth Day of July, 2005

JON W. DUDAS
*Director of the United States Patent and Trademark Office*